(12) United States Patent
Ujiie et al.

(10) Patent No.: US 11,595,422 B2
(45) Date of Patent: *Feb. 28, 2023

(54) METHOD FOR PREVENTING ELECTRONIC CONTROL UNIT FROM EXECUTING PROCESS BASED ON MALICIOUS FRAME TRANSMITTED TO BUS

(71) Applicant: PANASONIC INTELLECTUAL PROPERTY CORPORATION OF AMERICA, Torrance, CA (US)

(72) Inventors: Yoshihiro Ujiie, Osaka (JP); Hideki Matsushima, Tokyo (JP); Tomoyuki Haga, Nara (JP); Manabu Maeda, Osaka (JP); Yuji Unagami, Osaka (JP); Takeshi Kishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 17/344,097

(22) Filed: Jun. 10, 2021

(65) Prior Publication Data

US 2021/0306365 A1    Sep. 30, 2021

Related U.S. Application Data

(63) Continuation of application No. 16/566,269, filed on Sep. 10, 2019, now Pat. No. 11,063,971, which is a
(Continued)

(30) Foreign Application Priority Data

Dec. 4, 2014 (JP) .............................. JP2014-245451

(51) Int. Cl.
*H04L 29/06* (2006.01)
*H04L 9/40* (2022.01)
(Continued)

(52) U.S. Cl.
CPC .......... *H04L 63/1425* (2013.01); *H04L 12/40* (2013.01); *H04L 12/6418* (2013.01);
(Continued)

(58) Field of Classification Search
CPC ... H04L 63/08; H04L 63/101; H04L 63/1416; H04L 63/1425; H04L 12/40; H04L 12/6418
See application file for complete search history.

(56) References Cited

U.S. PATENT DOCUMENTS

| 8,694,879 B1 | 4/2014 | Peichl et al. |
| 2014/0032800 A1 | 1/2014 | Peirce et al. |

(Continued)

FOREIGN PATENT DOCUMENTS

| JP | 2012-249107 | 12/2012 |
| JP | 2013-131907 | 7/2013 |

(Continued)

OTHER PUBLICATIONS

International Search Report of PCT application No. PCT/JP2015/001376 dated May 12, 2015.
(Continued)

*Primary Examiner* — Jeffrey C Pwu
*Assistant Examiner* — Thong P Truong
(74) *Attorney, Agent, or Firm* — Greenblum & Bernstein, P.L.C.

(57) ABSTRACT

A method for use in a network communication system including a plurality of electronic controllers that communicate with each other via a bus in accordance with a Controller Area Network (CAN) protocol determines whether or not content of a predetermined field in a frame which has started to be transmitted meets a predetermined condition indicating fraud. In a case where the content of the predetermined field meets the predetermined condition, a
(Continued)

frame including predetermined consecutive dominant bits for notifying an anomaly is transmitted before an end of the frame is transmitted. A number of times the frame including the predetermined consecutive dominant bits is transmitted is recorded for each identifier (ID) represented by content of an ID field included in a plurality of frames which has been transmitted. A malicious electronic controller is determined in accordance with the number of times recorded for each ID.

10 Claims, 20 Drawing Sheets

Related U.S. Application Data continuation of application No. 15/275,860, filed on Sep. 26, 2016, now Pat. No. 10,454,957, which is a continuation of application No. PCT/JP2015/001376, filed on Mar. 12, 2015.

(60) Provisional application No. 61/974,739, filed on Apr. 3, 2014.

(51) Int. Cl.
*H04L 12/64* (2006.01)
*H04L 12/40* (2006.01)

(52) U.S. Cl.
CPC ............ *H04L 63/08* (2013.01); *H04L 63/101* (2013.01); *H04L 63/1416* (2013.01); *H04L 2012/40215* (2013.01)

(56) References Cited

U.S. PATENT DOCUMENTS

| | | | | |
|---|---|---|---|---|
| 2014/0280636 | A1* | 9/2014 | Fredriksson | H04L 65/1101 709/206 |
| 2014/0310530 | A1 | 10/2014 | Oguma et al. | |
| 2014/0328357 | A1 | 11/2014 | Fredriksson et al. | |
| 2015/0066239 | A1* | 3/2015 | Mabuchi | H04L 12/403 701/1 |
| 2015/0113638 | A1* | 4/2015 | Valasek | G06F 21/562 726/22 |

FOREIGN PATENT DOCUMENTS

| | | |
|---|---|---|
| JP | 2013-187555 | 9/2013 |
| WO | 2013/065689 | 5/2013 |
| WO | 2013/093591 | 6/2013 |

OTHER PUBLICATIONS

Masato Hata et al., "How to Stop Unauthorized Transmission in Controller Area Network", Computer Security Symposium 2011(CSS 2011), pp. 624-629, Oct. 19-21, 2011.

Masato Hata et al., "Implementation and Evaluation of a Method for Preventing Unauthorized Data Transmission", IEICE Technical Report, vol. 112, No. 342, pp. 15-22, Dec. 12, 2012.

Can Specification 2.0, Sep. 1991, [online], CAN in Automation (CiA), [searched on Nov. 14, 2014], Internet<URL: http://www.can-cia.org/fileadmin/cia/specifications/CAN20A.pdf>.

H. Krawczyk et al., "HMAC: Keyed-Hashing for Message Authentication", Network Working Group, RFC2104, Feb. 1997.

Extended European Search Report from European Patent Office (EPO) dated Mar. 24, 2017 for the related European Patent Application No. 15772752.0.

Tsutomu Matsumoto et al: "A Method of Preventing Unauthorized Data Transmission in Controller Area Network", 2012 IEEE 75th Vehicular Technology Conference (VTC Spring 2012) : Yokohama, Japan, May 6-9, 2012, IEEE, Piscataway, NJ, May 6, 2012 (May 6, 2012), pp. 1-5, XP032202711.

Daiki Sekiguchi et al., "White-List Hub: A Network Component to Suppress Unauthorized CAN Data Transmission", Institute of Electronics, Information and Communication Engineers Technical Committee on Information Security proceedings, The Institute of Electronics, Information and Communication Engineers (General Incorporated Association), Jan. 21, 2014 (Jan. 21, 2014), SCIS2014, pp. 1-8, together with a partial English language translation.

\* cited by examiner

FIG. 3
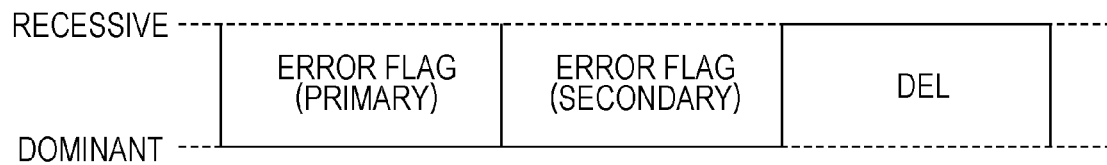
FIG. 4
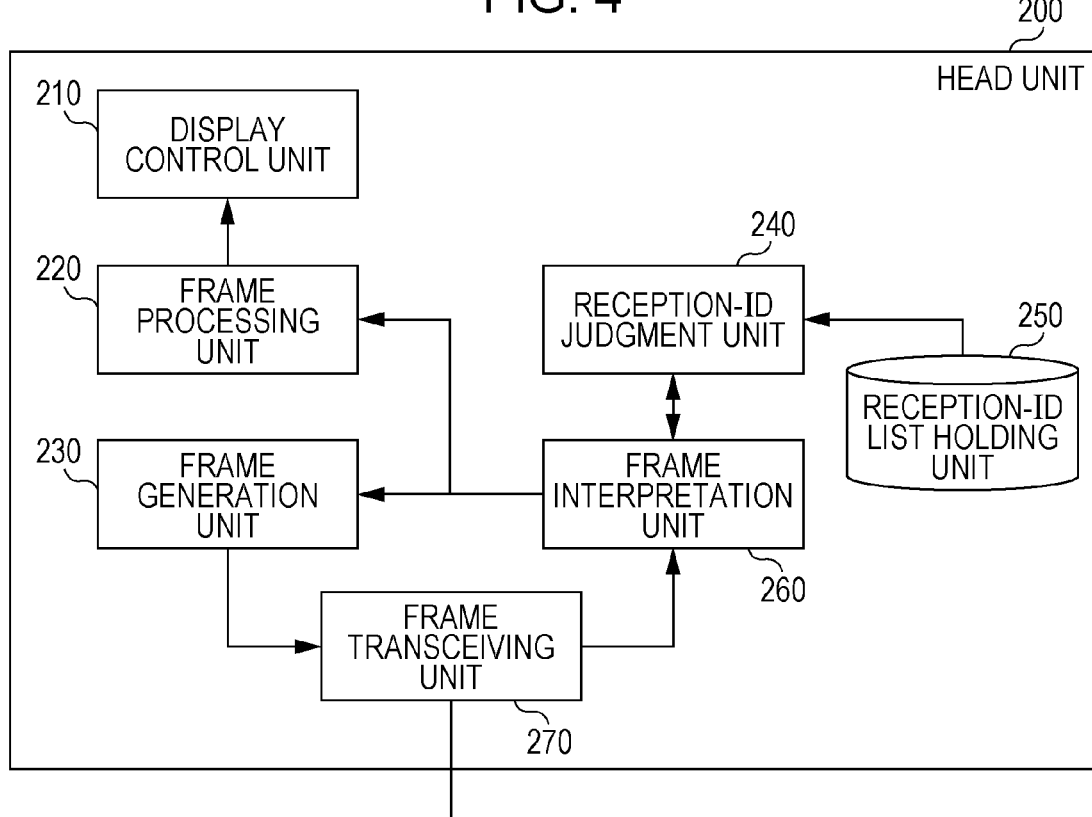
FIG. 5
| RECEPTION-ID LIST |
|---|
| 1 |
| 2 |
| 3 |
| 4 |

| TRANSFER SOURCE | TRANSFER DESTINATION | ID |
|---|---|---|
| 500a | 500b | * |
| 500a | 500c | * |
| 500b | 500a | 3 |
| 500b | 500c | * |
| 500c | 500a | – |
| 500c | 500b | – |

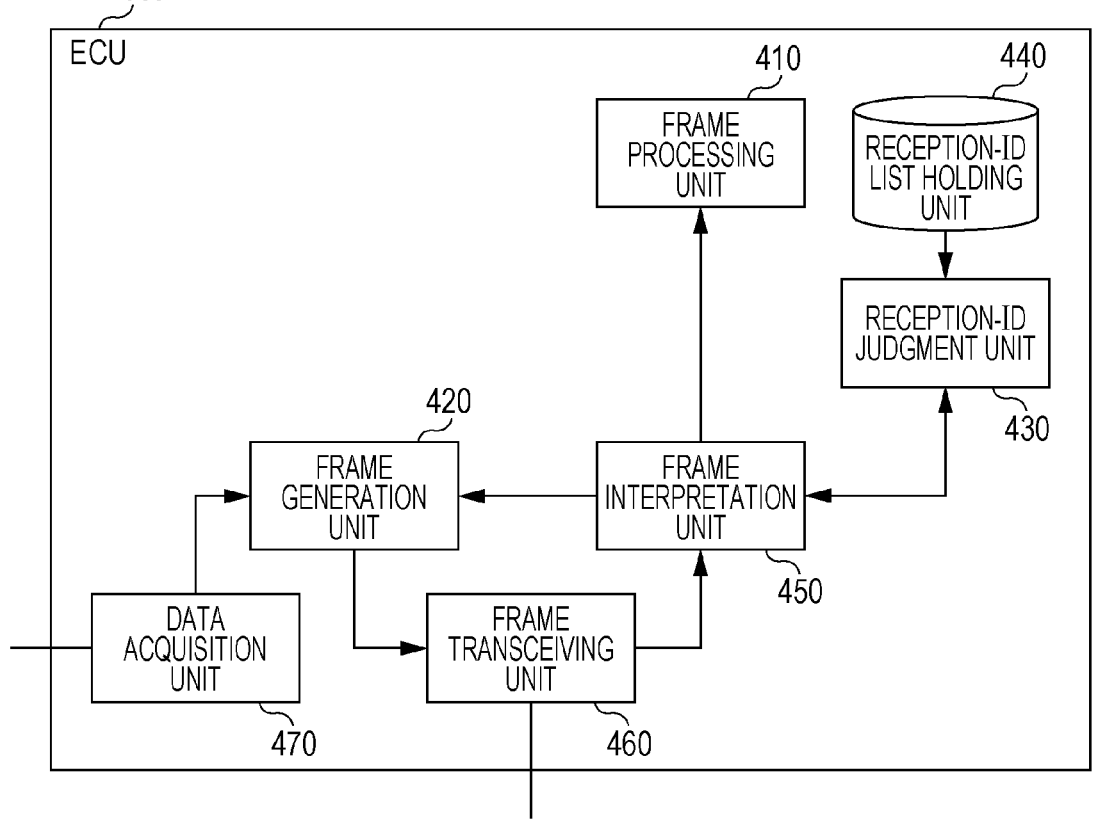

FIG. 11

| ID | DATA |
|---|---|
| 2 | 100 |
| 2 | 90 |
| 2 | 80 |
| 2 | 70 |
| 2 | 60 |
| ... | ... |

FIG. 12

| ID | DATA |
|---|---|
| 3 | 1 |
| 3 | 1 |
| 3 | 0 |
| 3 | 0 |
| 3 | 0 |
| ... | ... |

FIG. 13

| ID | DATA |
|---|---|
| 4 | 0 |
| 4 | 10 |
| 4 | 20 |
| 4 | 30 |
| 4 | 40 |
| ... | ... |

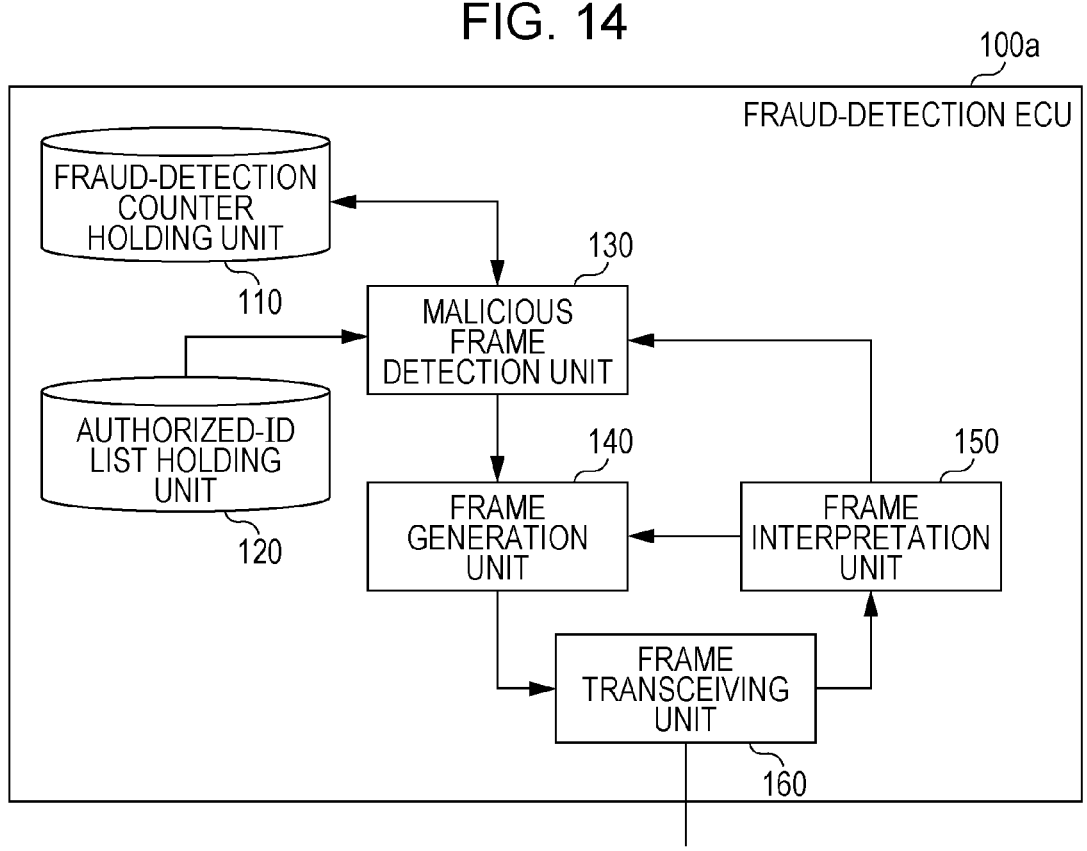

FIG. 17

| ID | FRAUD-DETECTION COUNTER |
|---|---|
| 1 | 0 |
| 2 | 0 |
| 3 | 0 |
| 4 | 1 |
| 5 | 0 |
| ... | ... |

| ID | DATA RANGE |
|---|---|
| 1 | 0 TO 180 |
| 2 | 0 TO 100 |
| 3 | 0, 1 |
| 4 | 0 TO 100 |
| ... | ... |
| | |

FIG. 26

| ID | DATA |
|---|---|
| 1 | 0  1  0x1a  c4  f7  d3 |
| 1 | 1  2  0xf9  3b  65  9e |
| 1 | 2  3  0x34  5c  ef  79 |
| 1 | 3  4  0x90  2a  e3  dd |
| 1 | 4  5  0x31  2c  d5  ee |
| ... | ... |

FIG. 27

| ID | DATA |
|---|---|
| 2 | 100  1  0x34  5d  ef  78 |
| 2 | 90   2  0x34  2d  d5  ea |
| 2 | 80   3  0x90  8a  e8  6b |
| 2 | 70   4  0x4a  d4  f7  d8 |
| 2 | 60   5  0xf1  32  7e  6a |
| ... | ... |

FIG. 28

| ID | DATA |
|---|---|
| 3 | 1  1  0x92  d5  e8  3b |
| 3 | 1  2  0x81  a2  c5  ca |
| 3 | 0  3  0xf8  4d  66  9a |
| 3 | 0  4  0x95  a2  3e  ac |
| 3 | 0  5  0x1b  c5  f6  d1 |
| ... | ... |

| ID | DATA |
|---|---|
| 4 | 0  1  0x9d  20  03  d3 |
| 4 | 10  2  0x3a  2d  5b  ef |
| 4 | 20  3  0x4c  c8  3b  b5 |
| 4 | 30  4  0x5f  f1  d2  da |
| 4 | 40  5  0xb1  0b  70  a4 |
| ... | ... |

FIG. 31

| ID | COUNTER |
|---|---|
| 1 | 1 |
| 2 | 10 |
| 3 | 15 |
| 4 | 100 |
| 5 | 0 |
| ... | ... |

METHOD FOR PREVENTING ELECTRONIC CONTROL UNIT FROM EXECUTING PROCESS BASED ON MALICIOUS FRAME TRANSMITTED TO BUS

CROSS-REFERENCE TO RELATED APPLICATION

This is a continuation of U.S. patent application Ser. No. 16/566,269, filed Sep. 10, 2019, which is a continuation of U.S. patent application Ser. No. 15/275,860, filed Sep. 26, 2016 and now U.S. Pat. No. 10,454,957 issued Oct. 22, 2019, which is a continuation of Int. Pat. Appl. No. PCT/JP2015/001376, filed Mar. 12, 2015, which claims the benefit of U.S. Prov. Pat. Appl. No. 61/974,739, filed Apr. 3, 2014, and priority to Jap. Pat. Appl. No. 2014-245451, filed Dec. 4, 2014. The disclosure of each of these documents, including the specification, drawings, and claims, is incorporated herein by reference in its entirety.

BACKGROUND

1. Technical Field

The present disclosure relates to a technique for detecting and handling malicious frames transmitted within an in-vehicle network or the like over which electronic control units perform communication.

2. Description of the Related Art

Systems in recent automobiles accommodate multiple devices called electronic control units (ECUs). A network connecting these ECUs is called an in-vehicle network. There exist multiple standards for the in-vehicle network. Among these standards, a standard called CAN (Controller Area Network) specified in ISO 11898-1 is one of the most mainstream in-vehicle network standards (see CAN Specification 2.0 Part A, [online], CAN in Automation (CiA), searched Nov. 14, 2014, the Internet (URL: http://www.can-cia.org/fileadmin/specifications/CAN20A.pdf)).

In CAN, each communication path (bus) is constituted by two cables (lines), and ECUs connected to the bus are referred to as nodes. Each node connected to a bus transmits and receives a message called a frame. A transmitting node that is to transmit a frame applies a voltage to two cables to generate a potential difference between the cables, thereby transmitting the value "1" called recessive and the value "0" called dominant. When a plurality of transmitting nodes transmit recessive and dominant values at completely the same timing, the dominant value is prioritized and transmitted. A receiving node transmits a frame called an error frame if the format of a received frame is anomalous. In an error frame, 6 consecutive dominant bits are transmitted to notify the transmitting nodes or any other receiving node of frame anomaly.

In CAN, furthermore, there is no identifier that designates a transmission destination or a transmission source. A transmitting node transmits frames each assigned an ID called a message ID (that is, sends signals to a bus), and each receiving node receives only a predetermined message ID (that is, reads a signal from the bus). In addition, the Carrier Sense Multiple Access/Collision Avoidance (CSMA/CA) scheme is adopted, and arbitration based on message IDs is performed for simultaneous transmission of a plurality of nodes so that a frame with the value of message ID being small is preferentially transmitted.

A connection of a malicious node to a bus in an in-vehicle network and a malicious transmission of a frame from the malicious node can possibly cause malicious control of the vehicle body.

SUMMARY

One non-limiting and exemplary embodiment provides a fraud-detection electronic control unit (fraud-detection ECU) that prevents a process based on a malicious frame transmitted to a bus from being executed by an ECU in a network communication system in which communication is established in accordance with the CAN protocol, such as that with an in-vehicle network. The present disclosure further provides an anti-fraud method for preventing a process corresponding to a malicious frame from being executed, and a network communication system including a fraud-detection ECU.

In one general aspect, the techniques disclosed here feature a method for use in a network communication system including a plurality of electronic controllers that communicate with each other via a bus in accordance with a Controller Area Network (CAN) protocol. The method includes determining whether or not content of a predetermined field in a frame which has started to be transmitted meets a predetermined condition indicating fraud; transmitting an error frame before an end of the frame is transmitted in a case where it is determined that the content of the predetermined field in the frame meets the predetermined condition; recording a number of times the error frame is transmitted in the transmitting, for each identifier (ID) represented by content of an ID field included in a plurality of frames which has been transmitted; and providing a notification in a case where the number of times recorded for an ID exceeds a predetermined count.

According to an embodiment of the present disclosure, even if a malicious node is connected to a bus and a malicious frame is transmitted in a network communication system in which communication is established in accordance with the CAN protocol, a process based on a malicious frame can be prevented from being executed by an ECU.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating the format of an error frame specified in the CAN protocol;

FIG. 4 is a configuration diagram of a head unit;

FIG. 5 is a diagram illustrating an example of a reception-ID list;

FIG. 8 is a configuration diagram of an ECU according to the first embodiment;

FIG. 9 is a diagram illustrating an example of a reception-ID list;

FIG. 10 is a diagram illustrating an example of an ID and a data field in a frame transmitted from an ECU connected to an engine;

FIG. 11 is a diagram illustrating an example of an ID and a data field in a frame transmitted from an ECU connected to brakes;

FIG. 12 is a diagram illustrating an example of an ID and a data field in a frame transmitted from an ECU connected to a door open/close sensor;

FIG. 13 is a diagram illustrating an example of an ID and a data field in a frame transmitted from an ECU connected to a window open/close sensor;

FIG. 14 is a configuration diagram of a fraud-detection ECU according to the first embodiment;

FIG. 15 is a diagram illustrating an example of an authorized-ID list held in the fraud-detection ECU;

FIG. 16 is a diagram illustrating an example of an authorized-ID list held in the fraud-detection ECU;

FIG. 17 is a diagram illustrating an example of the states of fraud-detection counters for individual message IDs;

FIG. 26 is a diagram illustrating an example of an ID and a data field in a data frame transmitted from an ECU connected to an engine;

FIG. 27 is a diagram illustrating an example of an ID and a data field in a data frame transmitted from an ECU connected to brakes;

FIG. 28 is a diagram illustrating an example of an ID and a data field in a data frame transmitted from an ECU connected to a door open/close sensor;

FIG. 31 is a diagram illustrating an example of counter values for individual message IDs held in a counter holding unit according to the third embodiment;

DETAILED DESCRIPTION

Figure 1:
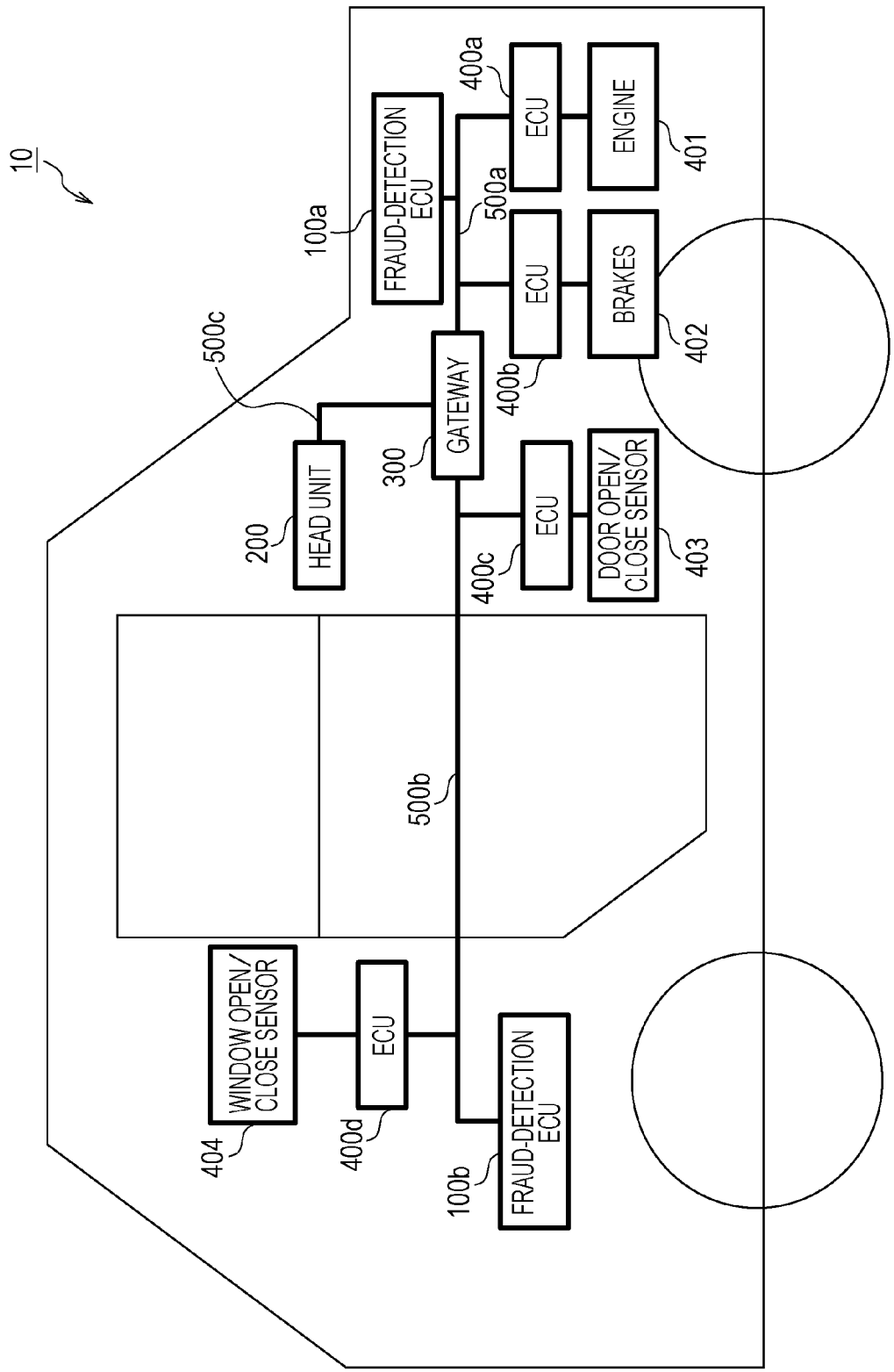
FIG. 1 is a diagram illustrating an overall configuration of an in-vehicle network system according to a first embodiment.

A method according to an aspect of the present disclosure is a method for use in a network communication system including a plurality of electronic controllers that communicate with each other via a bus in accordance with a Controller Area Network (CAN) protocol, the method including determining whether or not content of a predetermined field in a frame which has started to be transmitted meets a predetermined condition indicating fraud; transmitting an error frame before an end of the frame is transmitted in a case where it is determined that the content of the predetermined field in the frame meets the predetermined condition; recording a number of times the error frame is transmitted in the transmitting, for each identifier (ID) represented by content of an ID field included in a plurality of frames which has been transmitted; and providing a notification in a case where the number of times recorded for an ID exceeds a predetermined count. Examples of the predetermined condition indicating fraud include the content of the predetermined field not being included in a list indicating an authorized value group, the content of the predetermined field being included in a list indicating an unauthorized value group, the content of the predetermined field being within a certain range or having a value (such as an even number) having a certain feature, and a result obtained by performing predetermined computation on the content value having a predetermined value. Thus, even if a malicious node is connected to a bus and a malicious frame is transmitted in a network communication system in which communication is established in accordance with the CAN protocol, it is possible to prevent a process based on a malicious frame from being executed by each node (ECU).

In addition, in the transmitting, transmission of the error frame may be performed before an end of a CRC sequence in the frame is transmitted. Thus, for example, an ECU that checks a CRC sequence and processes a frame can be prevented from executing a process based on a malicious frame.

In addition, the predetermined field may be the ID field, and, in the determining, an ID represented by the content of the predetermined field may be compared with one or more IDs indicated by predetermined ID-list information to perform a determination of whether or not the predetermined condition is met. This allows judgment of fraud based on the ID field in a data frame or remote frame, for example, and can prevent each ECU from executing processing of a malicious frame.

In addition, the predetermined field may be a control field, and, in the determining, a determination of whether or not a data length represented by the content of the predetermined field is included in a predetermined range may be performed to determine whether or not the content meets the predetermined condition. This allows judgment of fraud based on the control field in a data frame or remote frame, for example, and can prevent each ECU from executing processing of a malicious frame.

In addition, the predetermined field may be a data field, and, in the determining, the predetermined condition may include the frame, which has started to be transmitted, being a data frame. Thus, each ECU can be prevented from executing, in accordance with data of a malicious data frame, a process corresponding to the data.

In addition, in the determining, a determination of whether or not a data value representing the content of the predetermined field is included in a predetermined range may be performed to determine whether or not the content meets the predetermined condition. Thus, for example, even if a malicious data frame including a data value within a malicious range is transmitted, each ECU can be prevented from executing a process corresponding to the data.

In addition, in the determining, a message authentication code in the content of the predetermined field may be verified by using a predetermined verification process procedure, and the content may be determined to meet the predetermined condition in a case where a verification has failed. Thus, if a malicious frame having no authorized message authentication code is transmitted, each ECU can be prevented from executing a process for the malicious frame.

In addition, in a case where the data frame is transmitted by an authorized electronic controller, the data field may include a message authentication code determined in accordance with a variable that changes each time the data frame is transmitted, and, in the determining, the content may be determined to meet the predetermined condition in a case where the message authentication code in the content of the predetermined field does not reflect the variable that changes each time the data frame is transmitted. This can make, for example, malicious interpretation of a message authentication code difficult.

In addition, in a case where the data frame is transmitted by an authorized electronic controller that includes a message authentication code key, the data field may include a message authentication code generated by using the message authentication code key, and, in the determining, a verification of the message authentication code in the content of the predetermined field may be performed by using a key corresponding to the message authentication code key. Thus, for example, a plurality of authorized ECUs can share a configuration for generating a message authentication code except for a message authentication code key.

The predetermined count may represent a value at which a transition to a passive state specified in the CAN protocol in accordance with a rule for handling a transmission error counter is to occur. In the providing, in a case where the number of times recorded for the ID exceeds the predetermined count, one of the electronic controllers that has transmitted a frame having the ID for which the number of times exceeds the predetermined count may be determined to be a malicious electronic controller that does not transition to the passive state, and the notification may notify of a presence of the malicious electronic controller.

Furthermore, a fraud-detection electronic controller according to an aspect of the present disclosure (fraud-detection ECU) is a fraud-detection electronic controller for connection to a bus that a plurality of electronic controllers which communicate with each other in accordance with a Controller Area Network (CAN) protocol use for communication. The fraud-detection electronic controllers includes one or more memories and circuitry which, in operation, performs operations including receiving a frame which has started to be transmitted; determining whether or not content of a predetermined field in the frame meets a predetermined condition indicating fraud; transmitting an error frame before an end of the frame is transmitted in a case where it is determined that the content of the predetermined field in the frame meets the predetermined condition; recording a number of times the error frame is transmitted in the transmitting, for each identifier (ID) represented by content of an ID field included in a plurality of frames which has been transmitted; and providing a notification in a case where the number of times recorded for an ID exceeds a predetermined count. Thus, even if a malicious node is connected to a bus connecting a plurality of ECUs that communicate with each other in accordance with the CAN protocol and a malicious frame is transmitted, it is possible to prevent each ECU from executing a process based on a malicious frame.

The predetermined count may represent a value at which a transition to a passive state specified in the CAN protocol in accordance with a rule for handling a transmission error counter is to occur. In the providing, in a case where the number of times recorded for the ID exceeds the predetermined count, one of the electronic controllers that has transmitted a frame having the ID for which the number of times exceeds the predetermined count may be determined to be a malicious electronic controller that does not transition to the passive state, and the notification may notify of a presence of the malicious electronic controller.

Furthermore, a network communication system according to an aspect of the present disclosure is a network communication system including a plurality of electronic controllers that communicate with each other via a bus in accordance with a Controller Area Network (CAN) protocol, and a fraud-detection electronic controller connected to the bus. The fraud-detection electronic controller includes one or more memories and circuitry which, in operation, performs operations including receiving a frame which has started to be transmitted; determining whether or not content of a predetermined field in the frame meets a predetermined condition indicating fraud; transmitting an error frame before an end of the frame is transmitted in a case where it is determined that the content of the predetermined field in the frame meets the predetermined condition; recording a number of times the error frame is transmitted in the transmitting, for each identifier (ID) represented by content of an ID field included in a plurality of frames which has been transmitted; and providing a notification in a case where the number of times recorded for an ID exceeds a predetermined count. Thus, even if a malicious node is connected to a bus and a malicious frame is transmitted, a process based on a malicious frame can be prevented from being executed by an ECU.

In the network communication system, a plurality of buses may be used for communication by the plurality of electronic controllers. The network communication system may further include a gateway device having a function of transferring a frame between the plurality of buses, and a plurality of fraud-detection electronic controllers each connected to a different bus. The predetermined field may be the ID field. In the determining, an ID represented by the content of the predetermined field may be compared with one or more IDs indicated by predetermined ID-list information to perform a determination of whether or not the predetermined condition is met. The ID-list information may be different for each of the plurality of fraud-detection electronic controllers.

It should be noted that these general or specific aspects may be implemented as a system, a method, an integrated circuit, a computer program, or a computer-readable recording medium such as a CD-ROM, or may be implemented as any combination of the system, the method, the integrated circuit, the computer program, or the recording medium.

In the following, a fraud-detection ECU according to embodiments will be described with reference to the drawings. Each of the embodiments described below shows a specific example of the present disclosure. Thus, the numerical values, constituent elements, the arrangement and connection of the constituent elements, steps (processes), the processing order of the steps, etc. shown in the following embodiments are mere examples, and do not limit the scope of the present disclosure. Among the constituent elements in the following embodiments, constituent elements not recited in any one of the independent claims are constituent elements that can be optionally added. In addition, the drawings are schematic and not representative of exact proportions or dimensions.

First Embodiment

An embodiment of the present disclosure will now be described with reference to the drawings in the context of an in-vehicle network system 10 including a fraud-detection ECU that implements an anti-fraud method for preventing a process based on a malicious frame from being executed on any other node (ECU) by using message IDs.

1.1 Overall Configuration of In-Vehicle Network System 10

FIG. 1 is a diagram illustrating an overall configuration of an in-vehicle network system 10 according to a first embodiment. The in-vehicle network system 10 is an example of a network communication system in which communication is established in accordance with the CAN protocol, and is a network communication system in an automobile provided with various devices such as a control device and a sensor. The in-vehicle network system 10 is configured to include buses 500*a* to 500*c*, fraud-detection ECUs 100*a* and 100*b*, a head unit 200, a gateway 300, and nodes connected to the buses, called ECUs, such as ECUs 400*a* to 400*d* connected to various devices. While the in-vehicle network system 10 may include numerous ECUs other than the ECUs 400*a* to 400*d*, which are not illustrated in FIG. 1, the description will be given here focusing on the ECUs 400*a* to 400*d*, for convenience. Each ECU is a device including, for example, digital circuits such as a processor (microprocessor) and a memory, analog circuits, a communication circuit, and so forth. The memory is a ROM, a RAM, or the like, and is capable of storing a control program (computer program) executed by the processor. For example, the processor operates in accordance with the control program (computer program), which results in the ECU implementing various functions. The computer program is constituted by a plurality of instruction codes indicating instructions for the processor to achieve a predetermined function. Here, the description is based on the assumption that a malicious ECU that transmits a malicious frame can possibly be connected to the buses 500*a* and 500*b*.

The fraud-detection ECUs 100*a* and 100*b* are ECUs connected to the bus 500*a* and the bus 500*b*, respectively, and having a function of determining whether frames transmitted from the ECUs 400*a* to 400*d*, etc. are malicious or not and transmitting an error frame if a malicious frame is present.

The ECUs 400*a* to 400*d* are each connected to any bus, and are connected to an engine 401, brakes 402, a door open/close sensor 403, and a window open/close sensor 404, respectively. Each of the ECUs 400*a* to 400*d* acquires the state of the device connected thereto (such as the engine 401), and periodically transmits a frame (data frame described below) or the like indicating the state to a network (that is, the bus).

The gateway 300 is connected to the bus 500*a* to which the fraud-detection ECU 100*a*, the ECU 400*a*, and the ECU 400*b* are coupled, the bus 500*b* to which the fraud-detection ECU 100*b*, the ECU 400*c*, and the ECU 400*d* are coupled, and the bus 500*c* to which the head unit 200 is coupled, and has a function of transferring a frame received from each bus to any other bus. It is also possible to switch for each connected bus between whether or not to transfer a received frame. The gateway 300 is also a kind of ECU.

The head unit 200 has a function of receiving a frame, and has a function of receiving frames transmitted from the ECUs 400*a* to 400*d* and displaying various states on a display (not illustrated) to present the states to a user. The head unit 200 is also a kind of ECU.

In the in-vehicle network system 10, each ECU sends and receives frames in accordance with the CAN protocol. There are the following frames in the CAN protocol: a data frame, a remote frame, an overload frame, and an error frame. The description will first focus on the data frame and the error frame, for convenience of illustration.

1.2 Data Frame Format

A description will now be given of the data frame, which is a frame used in a network compliant with the CAN protocol.

Figure 2:
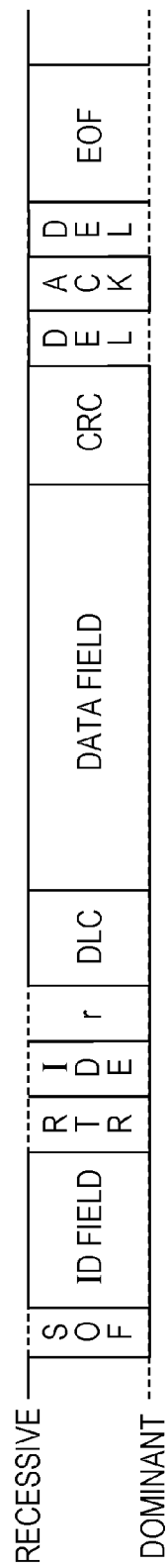
FIG. 2 is a diagram illustrating the format of a data frame specified in the CAN protocol.

FIG. 2 is a diagram illustrating the format of a data frame specified in the CAN protocol. In this figure there is illustrated a data frame in the standard ID format specified in the CAN protocol. The data frame is made up of the following fields: Start of Frame (SOF), ID field, Remote Transmission Request (RTR), Identifier Extension (IDE), reserved bit "r", Data Length Code (DLC), data field, Cyclic Redundancy Check (CRC) sequence, CRC delimiter "DEL", Acknowledgement (ACK) slot, ACK delimiter "DEL", and End of Frame (EOF).

The SOF is made up of one dominant bit. The recessive value is set for a state where a bus is idle, and is changed to the dominant value by the SOF to provide notification of the start of frame transmission.

The ID field is afield made up of 11 bits for storing an ID (message ID) that is a value indicating a type of data. It is designed such that a high priority is placed on a frame whose ID has a small value in order to use the ID field to arbitrate communication when a plurality of nodes simultaneously start transmission.

The RTR is a value for identifying a data frame and a remote frame, and is made up of one dominant bit for a data frame.

The IDE and "r" are both made up of one dominant bit.

The DLC is made up of 4 bits, and is a value indicating the length of the data field. The IDE, "r", and the DLC are collectively referred to as a control field.

The data field is a value made up of up to 64 bits, indicating the content of data to be transmitted. The length is adjustable every 8 bits. The specification of data to be sent is not specified in the CAN protocol and is defined in the in-vehicle network system 10. Accordingly, the specification is dependent on the type of vehicle, the manufacturer (producer), and so forth.

The CRC sequence is made up of 15 bits. The CRC sequence is calculated by using transmission values of the SOF, the ID field, the control field, and the data field.

The CRC delimiter is a delimiter made up of one recessive bit, indicating the end of the CRC sequence. The CRC sequence and the CRC delimiter are collectively referred to as a CRC field.

The ACK slot is made up of 1 bit. A transmitting node sets the recessive value in the ACK slot for transmission when transmitting the frame. A receiving node sets the dominant value in the ACK slot and transmits the frame if the receiving node has been able to correctly receive the frame up to the CRC sequence. Since the dominant value overrides the recessive value, if the ACK slot is constituted by the dominant value after transmission, the transmitting node can confirm that any receiving node has been successful in receiving the frame.

The ACK delimiter is a delimiter made up of one recessive bit, indicating the end of the ACK.

The EOF is made up of 7 recessive bits, and indicates the end of the data frame.

1.3 Error Frame Format

FIG. 3 is a diagram illustrating the format of an error frame specified in the CAN protocol. The error frame is constituted by an error flag (primary), an error flag (secondary), and an error delimiter.

The error flag (primary) is used to inform any other node of the occurrence of an error. A node that has detected an error transmits 6 consecutive dominant bits in order to inform any other node of the occurrence of the error. This transmission violates a bit-stuffing rule (in which the same value should not be transmitted over 6 or more consecutive bits) in the CAN protocol, and induces the transmission of an error frame (secondary) from any other node.

The error flag (secondary) is made up of 6 consecutive dominant bits, which is used to inform any other node of the occurrence of an error. All the nodes that have received the error flag (primary) and detected the violation of the bit-stuffing rule transmit an error flag (secondary).

The error delimiter "DEL" is made up of 8 consecutive recessive bits, and indicates the end of the error frame.

1.4 Configuration of Head Unit 200

The head unit 200 is a kind of ECU disposed on, for example, an instrument panel or the like of an automobile, including a display device such as a liquid crystal display (LCD) for displaying information to be viewed by a driver, an input unit that accepts the operation of the driver, and so forth.

FIG. 4 is a configuration diagram of the head unit 200. The head unit 200 is configured to include a frame transceiving unit 270, a frame interpretation unit 260, a reception-ID judgment unit 240, a reception-ID list holding unit 250, a frame processing unit 220, a display control unit 210, and a frame generation unit 230. These constituent elements are functional ones, and each of their functions is implemented by an element in the head unit 200, such as a communication circuit, an LCD, a processor that executes a control program stored in a memory, or a digital circuit.

The frame transceiving unit 270 transmits and receives a frame compliant with the CAN protocol to and from the bus 500c. The frame transceiving unit 270 receives a frame from the bus 500c bit-by-bit, and transfers the frame to the frame interpretation unit 260. Further, the frame transceiving unit 270 transmits the content of a frame of which the frame transceiving unit 270 has been notified by the frame generation unit 230 to the bus 500c bit-by-bit.

The frame interpretation unit 260 receives the values of the frame from the frame transceiving unit 270, and interprets the values so as to map the values into the respective fields in the frame formats specified in the CAN protocol. The frame interpretation unit 260 transfers a value judged to correspond to the ID field to the reception-ID judgment unit 240. In accordance with a determination result sent from the reception-ID judgment unit 240, the frame interpretation unit 260 determines whether to transfer the value in the ID field and the data field that appears after the ID field to the frame processing unit 220 or to abort reception of the frame (that is, abort interpretation of the frame) after the determination result has been received. Further, the frame interpretation unit 260 notifies the frame generation unit 230 of a request to transmit an error frame if the frame is judged not to comply with the CAN protocol, for example, if the values of the CRC do not match or if an item whose value should be fixed to the dominant value has the recessive value. Further, when an error frame is received, that is, when an error frame is interpreted to have started from a value in the received frame, the frame interpretation unit 260 discards the subsequent part of the frame, that is, aborts interpretation of the frame. For example, in a case where an error frame is interpreted to have started in the middle of the data frame, the interpretation of the data frame is aborted and a particular process is not performed according to the data frame.

The reception-ID judgment unit 240 receives the value in the ID field sent from the frame interpretation unit 260, and determines whether or not to receive the respective fields of the frame after the ID field, in accordance with a list of message IDs held in the reception-ID list holding unit 250. The reception-ID judgment unit 240 notifies the frame interpretation unit 260 of the determination result.

The reception-ID list holding unit 250 holds a reception-ID list that is a list of IDs (message IDs) which the head unit 200 receives. FIG. 5 is a diagram illustrating an example of the reception-ID list. The head unit 200 receives a frame (message) whose message ID is "1" from the ECU 400a connected to the engine 401, a frame whose message ID is "2" from the ECU 400b connected to the brakes 402, a frame whose message ID is "3" from the ECU 400c connected to the door open/close sensor 403, and a frame whose message ID is "4" from the ECU 400d connected to the window open/close sensor 404.

On the basis of the content of the received frame (for example, the message ID and the content of the data field), for example, the frame processing unit 220 forms an image to be displayed on the LCD and notifies the display control unit 210 of the image. The frame processing unit 220 may hold the received content of the data field and select and send an image to be displayed on the LCD (for example, an image for displaying the vehicle speed, an image for displaying the open or closed state of a window, etc.) in accordance with the operation of the driver which has been accepted through the input means.

The display control unit 210 displays, on the LCD or the like, the content of which the display control unit 210 has been notified by the frame processing unit 220.

In accordance with a notification of instructions from the frame interpretation unit 260 to transmit an error frame, the frame generation unit 230 forms an error frame and notifies the frame transceiving unit 270 of the error frame for transmission.

1.5 Example Reception-ID List 1

FIG. 5, described above, is a diagram illustrating an example of a reception-ID list held in each of the head unit 200, the gateway 300, the ECU 400c, and the ECU 400d. The reception-ID list illustrated by way of example in this figure is used to selectively receive and process a frame including a message ID that is an ID (message ID) whose value is any of "1", "2", "3", and "4". For example, the reception-ID list holding unit 250 of the head unit 200 holds the reception-ID list illustrated in FIG. 5. In this case, for a frame whose message ID is none of "1", "2", "3", and "4", the interpretation of the portion of the frame subsequent to the ID field by the frame interpretation unit 260 is aborted.

1.6 Configuration of Gateway 300

Figures 6, 7:
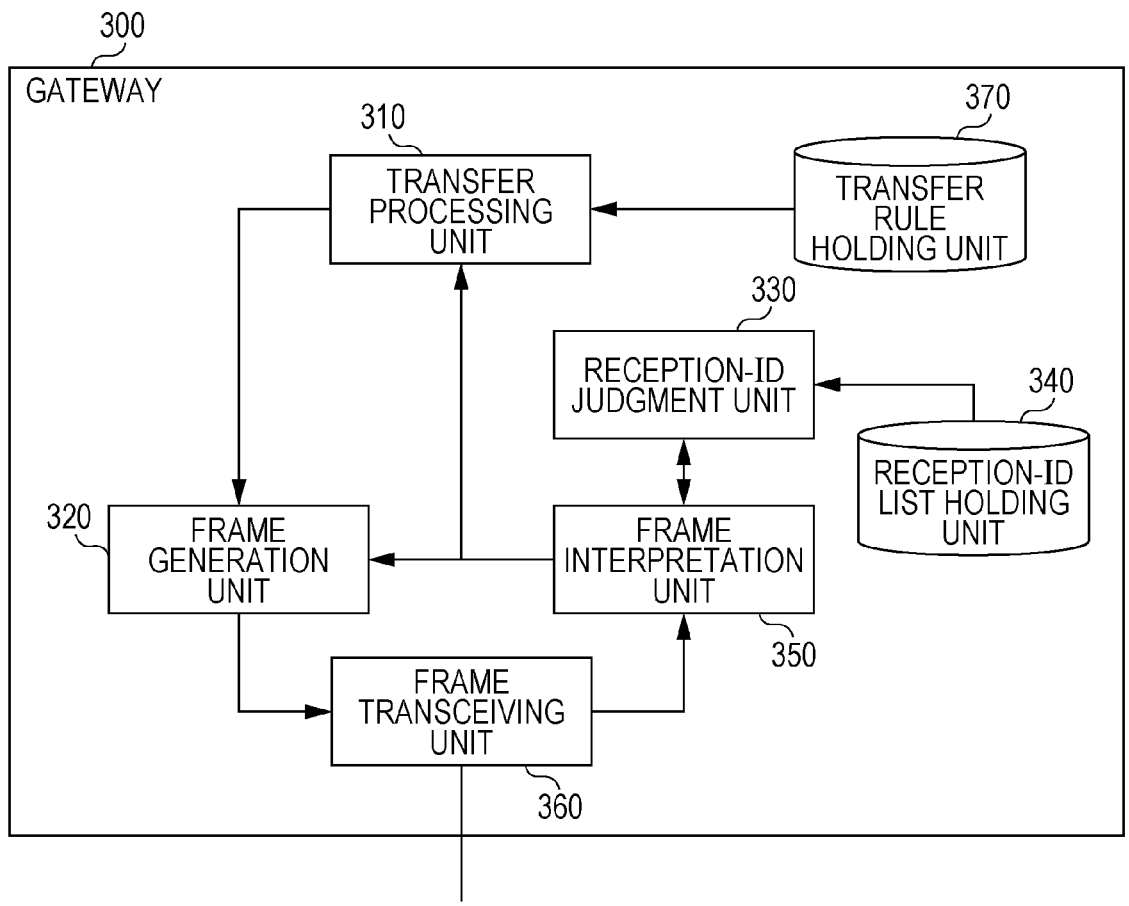
FIG. 6 is a configuration diagram of a gateway.
FIG. 7 is a diagram illustrating an example of transfer rules.

FIG. 6 is a configuration diagram of the gateway 300. The gateway 300 is configured to include a frame transceiving unit 360, a frame interpretation unit 350, a reception-ID judgment unit 330, a reception-ID list holding unit 340, a frame generation unit 320, a transfer processing unit 310, and a transfer rule holding unit 370. These constituent elements are functional ones, and each of their functions is implemented by an element in the gateway 300, such as a communication circuit, a processor that executes a control program stored in a memory, or a digital circuit.

The frame transceiving unit 360 transmits and receives a frame compliant with the CAN protocol to and from each of the buses 500a, 500b, and 500c. The frame transceiving unit 360 receives a frame from a bus bit-by-bit, and transfers the frame to the frame interpretation unit 350. Further, the frame transceiving unit 360 transmits the content of the frame to the buses 500a, 500b, and 500c bit-by-bit on the basis of the frame and bus information indicating a bus at the transfer destination of which the frame transceiving unit 360 has been notified by the frame generation unit 320.

The frame interpretation unit 350 receives the values of the frame from the frame transceiving unit 360, and interprets the values so as to map the values into the respective fields in the frame formats specified in the CAN protocol. The frame interpretation unit 350 transfers a value judged to correspond to the ID field to the reception-ID judgment unit 330. In accordance with a determination result sent from the reception-ID judgment unit 330, the frame interpretation unit 350 determines whether to transfer the value in the ID field and the data field (data) that appears after the ID field to the transfer processing unit 310 or to abort reception of the frame (that is, abort interpretation of the frame) after the determination result has been received. Further, the frame interpretation unit 350 notifies the frame generation unit 320 of a request to transmit an error frame if the frame is judged not to comply with the CAN protocol. Further, when an error frame is received, that is, when an error frame is interpreted to have started from a value in the received frame, the frame interpretation unit 350 discards the subsequent part of the frame, that is, aborts interpretation of the frame.

The reception-ID judgment unit 330 receives the value in the ID field sent from the frame interpretation unit 350, and determines whether or not to receive the respective fields of the frame after the ID field, in accordance with a list of message IDs held in the reception-ID list holding unit 340. The reception-ID judgment unit 330 notifies the frame interpretation unit 350 of the determination result.

The reception-ID list holding unit 340 holds a reception-ID list (see FIG. 5) that is a list of IDs (message IDs) which the gateway 300 receives.

The transfer processing unit 310 determines a bus to which transfer is made in accordance with transfer rules held in the transfer rule holding unit 370 on the basis of the message ID of the received frame, and notifies the frame generation unit 320 of bus information indicating the bus to which transfer is made and the message ID and data sent from the frame interpretation unit 350. Note that the gateway 300 does not transfer an error frame received from a certain bus to any other bus.

The transfer rule holding unit 370 holds transfer rules that are information representing rules for the transfer of frames to the respective buses. FIG. 7 is a diagram illustrating an example of the transfer rules.

In accordance with a notification of instructions to transmit an error frame, which is sent from the frame interpretation unit 350, the frame generation unit 320 forms an error frame and notifies the frame transceiving unit 360 of the error frame for transmission. Further, the frame generation unit 320 forms a frame by using the message ID and data sent from the transfer processing unit 310, and notifies the frame transceiving unit 360 of the frame and the bus information.

1.7 Example Transfer Rules

FIG. 7 illustrates an example of transfer rules held in the gateway 300, as described above. The transfer rules associate buses at transfer sources, buses at transfer destinations, and IDs (message IDs) to be transferred with one another. In FIG. 7, the sign "*" indicates that a frame is transferred regardless of the message ID. In this figure, furthermore, the sign "-" indicates no frame to be transferred. The illustrated example indicates that the frames received from the bus 500a are set to be transferred to the bus 500b and the bus 500c regardless of the message ID. It also indicates that the frames received from the bus 500b are set so that all the frames are transferred to the bus 500c whereas only a frame whose message ID is "3" is transferred to the bus 500a. It also indicates that the frames received from the bus 500c are set not to be transferred to the bus 500a or the bus 500b.

1.8 Configuration of ECU 400a

FIG. 8 is a configuration diagram of the ECU 400a. The ECU 400a is configured to include a frame transceiving unit 460, a frame interpretation unit 450, a reception-ID judgment unit 430, a reception-ID list holding unit 440, a frame processing unit 410, a frame generation unit 420, and a data acquisition unit 470. These constituent elements are functional ones, and each of their functions is implemented by an element in the ECU 400a, such as a communication circuit, a processor that executes a control program stored in a memory, or a digital circuit.

The frame transceiving unit 460 transmits and receives a frame compliant with the CAN protocol to and from the bus 500a. The frame transceiving unit 460 receives a frame from the bus 500a bit-by-bit, and transfers the frame to the frame interpretation unit 450. Further, the frame transceiving unit 460 transmits the content of a frame of which the frame transceiving unit 460 has been notified by the frame generation unit 420 to the bus 500a.

The frame interpretation unit 450 receives the values of the frame from the frame transceiving unit 460, and interprets the values so as to map the values into the respective fields in the frame formats specified in the CAN protocol. The frame interpretation unit 450 transfers a value judged to correspond to the ID field to the reception-ID judgment unit 430. In accordance with a determination result sent from the reception-ID judgment unit 430, the frame interpretation unit 450 determines whether to transfer the value in the ID field and the data field that appears after the ID field to the frame processing unit 410 or to abort reception of the frame (that is, abort interpretation of the frame) after the determination result has been received. Further, the frame interpretation unit 450 notifies the frame generation unit 420 of a request to transmit an error frame if the frame is judged not to comply with the CAN protocol. Further, when an error frame is received, that is, when an error frame is interpreted to have started from a value in the received frame, the frame interpretation unit 450 discards the subsequent part of the frame, that is, aborts interpretation of the frame.

The reception-ID judgment unit 430 receives the value in the ID field sent from the frame interpretation unit 450, and determines whether or not to receive the respective fields of the frame after the ID field, in accordance with a list of message IDs held in the reception-ID list holding unit 440. The reception-ID judgment unit 430 notifies the frame interpretation unit 450 of the determination result.

The reception-ID list holding unit 440 holds a reception-ID list that is a list of IDs (message IDs) which the ECU 400a receives. FIG. 9 is a diagram illustrating an example of the reception-ID list.

The frame processing unit 410 performs a process related to a function that is different for each ECU in accordance with the data of the received frame. For example, the ECU 400a connected to the engine 401 has a function of sounding an alarm when a door is open while the vehicle speed is over 30 km per hour. The ECU 400a includes, for example, a speaker or the like for sounding an alarm. The frame processing unit 410 of the ECU 400a manages data (for example, information indicating the state of the doors) received from any other ECU, and performs processes such as a process for sounding an alarm in a certain condition on the basis of the average speed per hour acquired from the engine 401.

The data acquisition unit 470 acquires data indicating the state of the elements connected to the ECUs, such as devices and sensors, and notifies the frame generation unit 420 of the data.

In accordance with a notification of instructions to transmit an error frame, which is sent from the frame interpretation unit 450, the frame generation unit 420 forms an error frame and notifies the frame transceiving unit 460 of the error frame for transmission. Further, the frame generation unit 420 adds a predetermined message ID to the value of the data sent from the data acquisition unit 470 to form a frame, and notifies the frame transceiving unit 460 of the frame.

Each of the ECUs 400b to 400d also has a configuration basically similar to that of the ECU 400a described above. However, the reception-ID list held in the reception-ID list holding unit 440 may have content different from one ECU to another. The ECU 400b holds the reception-ID list illustrated by way of example in FIG. 9, and the ECU 400c and the ECU 400d hold the reception-ID list illustrated by way of example in FIG. 5. Furthermore, the content of the process of the frame processing unit 410 differs from one ECU to another. For example, the content of the process of the frame processing unit 410 in the ECU 400c Includes a process related to a function of sounding an alarm if a door is opened while the brakes are released. For example, the frame processing units 410 in the ECU 400b and the ECU 400d do not perform a special process. Each ECU may have functions other than those described for illustrative purposes here. The content of respective frames transmitted from the ECUs 400a to 400d will be described below with reference to FIGS. 10 to 13.

1.9 Example Reception-ID List 2

FIG. 9, described above, is a diagram illustrating an example of a reception-ID list held in each of the ECU 400a and the ECU 400b. The reception-ID list illustrated by way of example in this figure is used to selectively receive and process a frame including a message ID that is an ID (message ID) whose value is any of "1", "2", and "3". For example, the reception-ID list holding unit 440 of the ECU 400a holds the reception-ID list illustrated in FIG. 9. In this case, for a frame whose message ID is none of "1", "2", and "3", the interpretation of the portion of the frame subsequent to the ID field by the frame interpretation unit 450 is aborted.

1.10 Example Transmission Frame from Engine-Related ECU 400a

FIG. 10 is a diagram illustrating an example of an ID (message ID) and a data field (data) in a frame transmitted from the ECU 400a connected to the engine 401. The ECU 400a transmits a frame whose message ID is "1". The data represents the average speed per hour (km/h), taking a value in the range from a minimum speed of 0 (km/h) to a maximum speed of 180 (km/h), and has a length of 1 byte. FIG. 10 illustrates, from top to bottom, message IDs and data corresponding to frames transmitted sequentially from the ECU 400a, by way of example, and depicts acceleration, increasing the speed from 0 km/h in increments of 1 km/h.

1.11 Example Transmission Frame from Brake-Related ECU 400b

FIG. 11 is a diagram illustrating an example of an ID (message ID) and a data field (data) in a frame transmitted from the ECU 400b connected to the brakes 402. The ECU 400b transmits a frame whose message ID is "2". The data represents the degree to which the brakes are applied, expressed as a percentage (%), and has a length of 1 byte. A percentage of 0(%) indicates a state where the brakes are not applied at all and 100(%) indicates a state where the brakes are maximally applied. FIG. 11 illustrates, from top to bottom, message IDs and data corresponding to frames transmitted sequentially from the ECU 400b, by way of example, and depicts a gradual easing off of the brakes from 100%.

1.12 Example Transmission Frame from Door-Open/Close-Sensor-Related ECU 400c FIG. 12 is a diagram illustrating an example of an ID (message ID) and a data field (data) in a frame transmitted from the ECU 400c connected to the door open/close sensor 403. The ECU 400c transmits a frame whose message ID is "3". The data represents the open or closed state for the door, and has a length of 1 byte. The data has the value "1" for a door-open state and the value "0" for a door-closed state. FIG. 12 illustrates, from top to bottom, message IDs and data corresponding to frames transmitted sequentially from the ECU 400c, by way of example, and depicts a gradual transition from the door-open state to the closed state.

1.13 Example Transmission Frame from Window-Open/Close-Sensor-Related ECU 400d FIG. 13 is a diagram illustrating an example of an ID (message ID) and a data field (data) in a frame transmitted from the ECU 400d connected to the window open/close sensor 404. The ECU 400d transmits a frame whose message ID is "4". The data represents the open or closed state for the window, expressed as a percentage (%), and has a length of 1 byte. A percentage of 0(%) indicates a state where the window is completely closed and 100(%) indicates a state where the window is completely open. FIG. 13 illustrates, from top to bottom, message IDs and data corresponding to frames transmitted sequentially from the ECU 400d, by way of example, and depicts a gradual transition from the window-closed state to the open state.

1.14 Configuration of Fraud-Detection ECU 100a

FIG. 14 is a configuration diagram of the fraud-detection ECU 100a. The fraud-detection ECU 100a is configured to include a frame transceiving unit 160, a frame interpretation unit 150, a malicious frame detection unit 130, an authorized-ID list holding unit 120, a fraud-detection counter holding unit 110, and a frame generation unit 140. These constituent elements are functional ones, and each of their functions is Implemented by an element in the fraud-detection ECU 100a, such as a communication circuit, a processor that executes a control program stored in a memory, or a digital circuit. While the fraud-detection ECU 100*b* also has a configuration basically similar to that described above, the content of list Information (authorized-ID list) held in the authorized-ID list holding unit 120 is different between the fraud-detection ECU 100*a* and the fraud-detection ECU 100*b*.

The frame transceiving unit 160 transmits and receives a frame compliant with the CAN protocol to and from the bus 500*a*. That is, the frame transceiving unit 160 serves as a so-called receiving unit that receives a frame when frame transmission on a bus is started, and serves as a so-called transmitting unit that transmits an error frame and the like to the bus. That is, the frame transceiving unit 160 receives a frame from the bus 500*a* bit-by-bit, and transfers the frame to the frame interpretation unit 150. Further, the frame transceiving unit 160 transmits the content of a frame of which the frame transceiving unit 160 has been notified by the frame generation unit 140 to the bus 500*a*.

The frame interpretation unit 150 receives the values of the frame from the frame transceiving unit 160, and interprets the values so as to map the values into the respective fields in the frame formats specified in the CAN protocol. The frame interpretation unit 150 transfers a value judged to correspond to the ID field to the malicious frame detection unit 130. Further, the frame interpretation unit 150 notifies the frame generation unit 140 of a request to transmit an error frame if the frame is judged not to comply with the CAN protocol. Further, when an error frame is received, that is, when an error frame is interpreted to have started from a value in the received frame, the frame interpretation unit 150 discards the subsequent part of the frame, that is, aborts interpretation of the frame.

The malicious frame detection unit 130 receives the value in the ID field sent from the frame interpretation unit 150, and determines whether or not the value in the ID field meets a predetermined condition indicating fraud. That is, the malicious frame detection unit 130 functions as a so-called determination unit that determines whether or not the content of a predetermined field in a received frame meets a predetermined condition indicating fraud. The predetermined condition indicating fraud is a condition in which the value in the ID field is not included in the list of message IDs held in the authorized-ID list holding unit 120. That is, the malicious frame detection unit 130 determines whether the sent value (message ID) of the ID field is malicious or not, in accordance with the list of message IDs held in the authorized-ID list holding unit 120. If a message ID which is not included in this list (that is, an authorized-ID list described below) is received, the malicious frame detection unit 130 notifies the fraud-detection counter holding unit 110 of the received message ID in order to increment the number of times fraud has been detected. If a message ID which is not included in the authorized-ID list is received, the malicious frame detection unit 130 further notifies the frame generation unit 140 of a request to transmit an error frame. Further, when the number of times fraud has been detected reaches a certain number or more, the malicious frame detection unit 130 is notified of this by the fraud-detection counter holding unit 110, and notifies the frame generation unit 140 of a request to transmit an error display message (frame) indicating the presence of a malicious ECU that issues the corresponding message ID. The message ID of the error display message is determined in advance, and the head unit 200 is configured to receive the message (frame) of the message ID and to provide error display. Although the error display message is not described herein for convenience of illustration, the message ID of the error display message is contained in the reception-ID lists held in the gateway 300 and the head unit 200 and in the authorized-ID list described below. Note that the message ID for the error display message is not illustrated in FIG. 15 and FIG. 16.

The authorized-ID list holding unit 120 holds an authorized-ID list that is a list defining in advance message IDs Included in frames to be transmitted on the bus 500*a* in the in-vehicle network system 10 (see FIG. 15 and FIG. 16).

The fraud-detection counter holding unit 110 holds, for each message ID, a fraud-detection counter for counting the number of times detection has been performed, and, upon being notified of a message ID by the malicious frame detection unit 130, increments (increases) the corresponding fraud-detection counter. When a fraud-detection counter reaches a certain number (a predetermined count) or more, the fraud-detection counter holding unit 110 notifies the malicious frame detection unit 130 that the certain number has been exceeded. Examples of the term "certain number (predetermined count)", as used herein, include a value determined in accordance with handling rules for a transmission error counter in the CAN protocol. The CAN protocol specifies that the transmission error counter counts up by 8 each time an ECU blocks transmission by using an error frame. It also specifies that, as a result, when a transmission error counter in a transmitting node counts up to 128, the transmitting node transitions to a passive state so that no frame is transmitted. Accordingly, setting the certain number to 17, which is larger than 128/8 (=16), allows an error display message to be transmitted from the fraud-detection ECU 100*a* when the presence of a transmitting node (malicious ECU) that ignores the rule related to a transmission error counter in the CAN protocol is estimated. If a malicious ECU that transmits a malicious frame follows the rule related to a transmission error counter in the CAN protocol, the fraud-detection ECU 100*a* transmits an error frame, which results in the transmission error counter of the malicious ECU being incremented by 8. In this case, when the transmission error counter of the malicious ECU increases up to 128 due to the repeated transmission of a malicious frame, the malicious ECU transitions to the passive state to stop transmission of a malicious frame from the malicious ECU.

In accordance with a notification of Instructions to transmit an error frame, which is sent from the frame interpretation unit 150, the frame generation unit 140 forms an error frame and notifies the frame transceiving unit 160 of the error frame for transmission. Further, in accordance with a notification of instructions to transmit an error frame, which is sent from the malicious frame detection unit 130, the frame generation unit 140 forms an error frame and notifies the frame transceiving unit 160 of the error frame for transmission. In addition, in accordance with a notification of Instructions to transmit an error display message, which is sent from the malicious frame detection unit 130, furthermore, the frame generation unit 140 notifies the frame transceiving unit 160 of an error display message for transmission.

1.15 Example Authorized-ID List in Fraud-Detection ECU 100*a*

FIG. 15 is a diagram illustrating an example of an authorized-ID list held in the authorized-ID list holding unit 120 of the fraud-detection ECU 100*a*. The authorized-ID list illustrated by way of example in this figure indicates that a frame including a message ID that is an ID (message ID) whose value is any of "1", "2", and "3" may be allowed to flow over the bus 500*a*.

1.16 Example Authorized-ID List in Fraud-Detection ECU 100*b*

FIG. 16 is a diagram illustrating an example of an authorized-ID list held in the authorized-ID list holding unit 120 of the fraud-detection ECU 100*b*. The authorized-ID list illustrated by way of example in this figure indicates that a frame including a message ID that is an ID (message ID) whose value is any of "1", "2", "3", and "4" may be allowed to flow over the bus 500*b*.

1.17 Example Fraud-Detection-Counter Saving List

Figure 17:
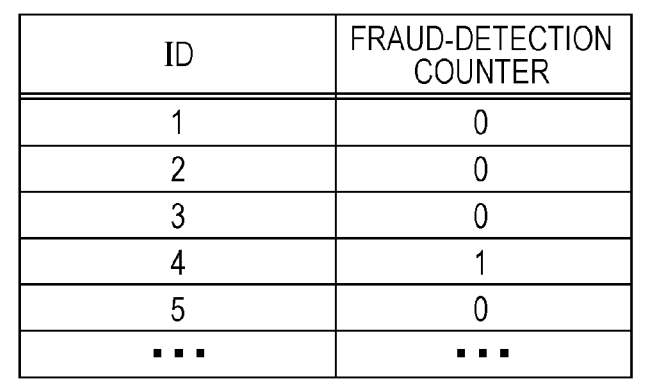

FIG. 17 is a diagram illustrating an example of the states of fraud-detection counters for individual message IDs. The illustrated example indicates that only a fraud-detection counter for which the message ID is "4" has detected fraud once while no fraud has been detected for the other message IDs. That is, the illustrated example indicates a case where the fraud-detection ECU 100*a* has detected a transmission of a message (frame) with message ID "4", which would not have flowed over the bus 500*a*, and the fraud-detection counter corresponding to the message ID "4" has been incremented by 1.

1.18 Sequence for Malicious-Frame Detection

A description will now be given of the operation of the fraud-detection ECU 100*a*, the ECU 400*a*, the ECU 400*b*, the gateway 300, and so forth connected to the bus 500*a* in the in-vehicle network system 10 having the configuration described above in a case where a malicious ECU is connected to the bus 500*a*.

Figure 18:
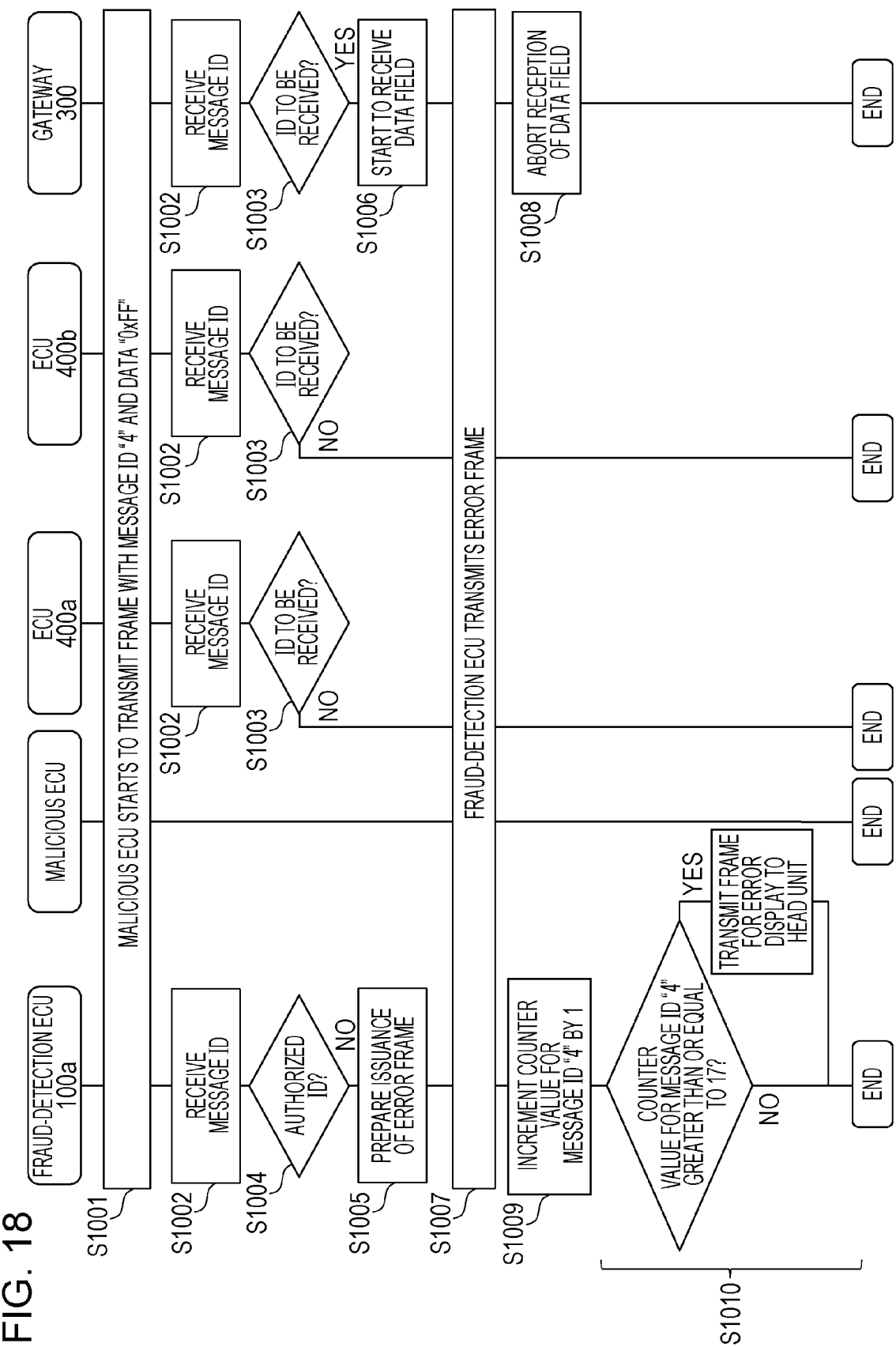
FIG. 18 is a sequence diagram illustrating an example operation for detecting a malicious frame and preventing execution of the malicious frame in the first embodiment.

FIG. 18 is a sequence diagram illustrating an example operation for, in response to detection of a malicious frame (message) by the fraud-detection ECU 100*a*, preventing any other ECU from performing a process corresponding to the malicious frame. In this figure, an example is illustrated in which a malicious ECU transmits a data frame whose message ID is "4" and data field (data) is "255 (0xFF)" to the bus 500*a*. Here, respective sequences represent individual process procedures (steps) performed by various devices.

First, a malicious ECU starts to transmit a data frame whose message ID is "4" and data is "255 (0xFF)" (sequence S1001). The values of the bits included in the frame are sequentially delivered to the bus 500*a* in the order of the SOF, the ID field (message ID), etc. In accordance with the data frame format described above.

When the malicious ECU completes the delivery of the frame up to the ID field (message ID) to the bus 500*a*, each of the fraud-detection ECU 100*a*, the ECU 400*a*, the ECU 400*b*, and the gateway 300 receives a message ID (sequence S1002).

Each of the ECU 400*a*, the ECU 400*b*, and the gateway 300 checks the message ID by using the reception-ID list held therein (sequence S1003). At this time, the fraud-detection ECU 100*a* checks the message ID by using the authorized-ID list held therein (sequence S1004). That is, the fraud-detection ECU 100*a* determines whether or not the content of the ID field in the transmitted frame meets a predetermined condition (in which the content is not contained in the authorized-ID list) indicating fraud.

In sequence S1003, the ECU 400*a* and the ECU 400*b* terminate reception since the respectively held reception-ID lists do not include "4" (see FIG. 9). That is, a frame that the malicious ECU continuously transmits is no longer interpreted, nor is the process corresponding to the frame performed. In sequence S1003, furthermore, the gateway 300 continues reception since the held reception-ID list includes "4" (see FIG. 5). In sequence S1004, the fraud-detection ECU 100*a* judges that the message ID is malicious since the held authorized-ID list does not include "4", and then starts to prepare the issuance of an error frame (sequence S1005).

Subsequently to sequence S1003, the gateway 300 continues the reception of the frame. For example, while the fraud-detection ECU 100*a* is preparing the issuance of an error frame, the part subsequent to the ID field, namely, the RTR and the control field (IDE, r, DLC), is sequentially delivered to the bus 500*a* from the malicious ECU, and then the data field is sequentially delivered bit-by-bit. The gateway 300 receives the RTR and the control field (IDE, r, DLC), and then starts the reception of the data field (sequence S1006).

Then, the preparation of the issuance of an error frame is completed, and the fraud-detection ECU 100*a* transmits an error frame (sequence S1007). The transmission of the error frame is performed before the transmission of the end of the malicious frame (for example, before the transmission of the end of the CRC sequence). In the illustrated example operation, the error frame is transmitted in the middle of the data field. The transmission of the error frame is started, thus allowing the middle part of the data field in the frame being transmitted from the malicious ECU to be overwritten with the error frame (a bit sequence of the prioritized dominant value) on the bus 500*a*.

Upon receipt of the error frame transmitted in sequence S1007, the gateway 300 aborts reception of the frame being transmitted from the malicious ECU during the reception of the data field (sequence S1008). That is, the data field from the malicious ECU has been overwritten with the error frame, and the gateway 300 detects the error frame and thus does not continue the reception of the frame being transmitted from the malicious ECU.

The fraud-detection ECU 100*a* Increments the fraud-detection counter corresponding to the message ID "4" of the data frame for which the error frame has been transmitted (sequence S1009).

If the fraud-detection counter corresponding to the message ID "4" becomes greater than or equal to 17 as a result of the increment, the fraud-detection ECU 100*a* transmits a frame indicating error display (error display message) so that the frame can be received by the head unit 200 (sequence S1010). Consequently, the frame processing unit 220 of the head unit 200 performs a process for providing error display, and an error notification is issued via an LCD or the like. The error notification may be issued via, in place of display on an LCD or the like, audio output, light emission, or the like.

1.19 Advantageous Effects of First Embodiment

A fraud-detection ECU illustrated in the first embodiment determines whether a transmitted frame (data frame) is a malicious frame or not by using an authorized-ID list in terms of the ID field of the frame. This enables fraud to be determined based on the ID field in the data frame, and can thus prevent existing nodes (that is, ECUs other than a fraud-detection ECU and a malicious ECU) from interpreting a malicious frame and from performing a process corresponding to the frame. In addition, it is only required to receive the portion up to the ID field subsequent to the SOF at the beginning of the data frame to perform determination. This makes it possible to reduce bus traffic, compared to the case where determination is performed after the receipt of the latter part or the like of the data frame.

In addition, the fraud-detection ECU counts the number of times an error frame has been transmitted, by using fraud-detection counters, and can thus detect that a transmission error counter in a node that transmits a malicious message ID has reached an upper limit value at which the transition to the passive state is required according to the CAN protocol in response to receipt of an error frame. This makes it possible to determine whether or not a node that transmits a malicious message ID is compatible with the specification of an error counter in the CAN protocol.

In addition, the use of only a fraud-detection ECU as a node for determining the presence of a malicious frame can minimize the effect on the existing network configuration, resulting in the amount of processing and the amount of power consumption being reduced in the entire system.

Second Embodiment

An embodiment of the present disclosure will now be described in the context of an in-vehicle network system 11 including a fraud-detection ECU that implements an anti-fraud method for preventing a process based on a malicious frame from being executed on any other node (ECU) on the basis of a data range allowed for each message ID.

2.1 Overall Configuration of In-Vehicle Network System 11

Figure 19:
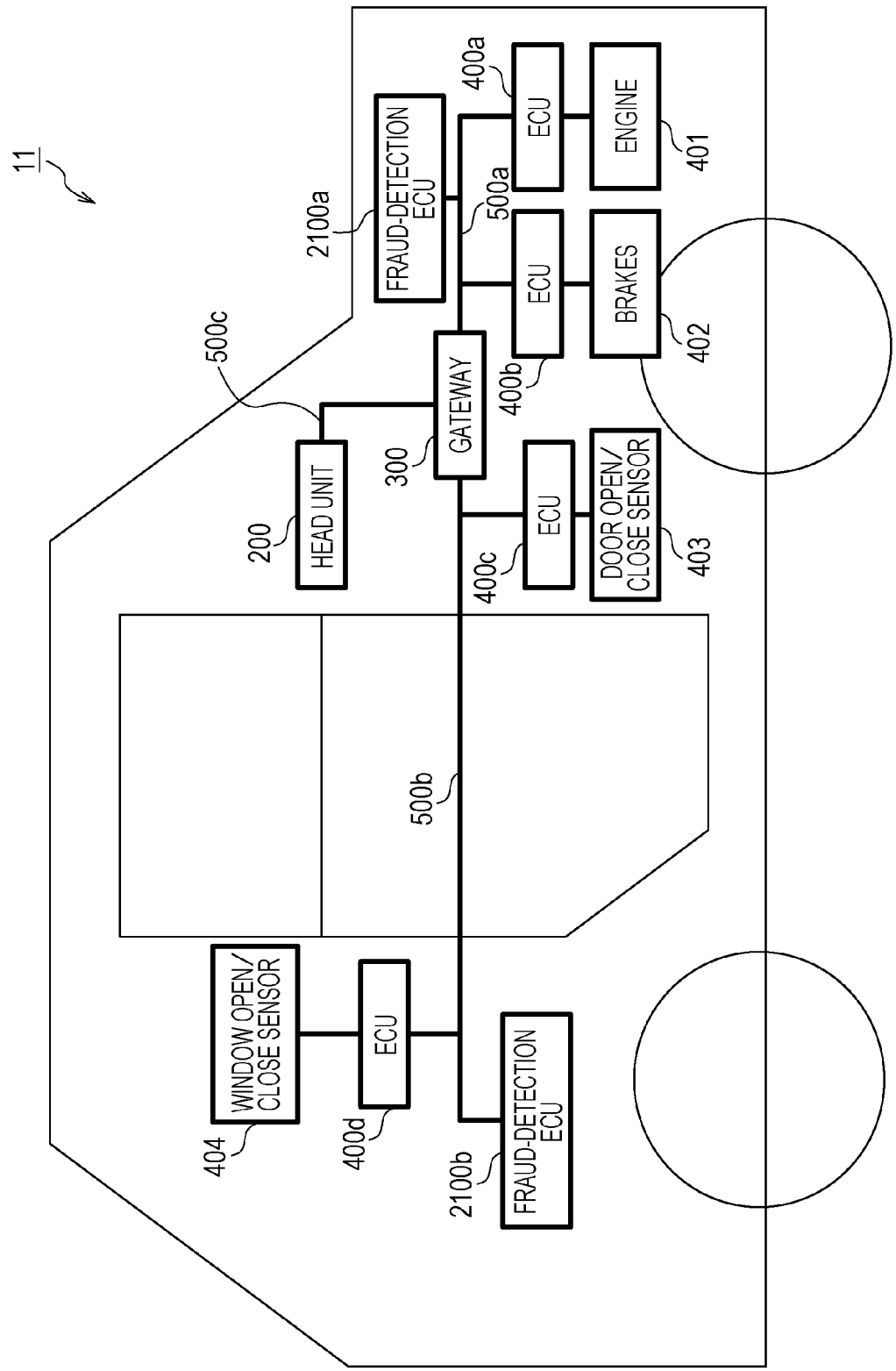
FIG. 19 is a diagram illustrating an overall configuration of an in-vehicle network system according to a second embodiment.

FIG. 19 is a diagram illustrating an overall configuration of an in-vehicle network system 11 according to a second embodiment. The in-vehicle network system 11 is obtained by modifying part of the in-vehicle network system 10 illustrated in the first embodiment. The in-vehicle network system 11 is configured to include buses 500a to 500c, fraud-detection ECUs 2100a and 2100b, a head unit 200, a gateway 300, and nodes connected to the buses, called ECUs, such as ECUs 400a to 400d connected to various devices. Of the constituent elements of the in-vehicle network system 11, constituent elements having functions similar to those in the first embodiment are designated by the same numerals and are not described.

The fraud-detection ECUs 2100a and 2100b are ECUs connected to the bus 500a and the bus 500b, respectively, and having a function of determining whether frames transmitted from the ECUs 400a to 400d, etc. are malicious or not and transmitting an error frame if a malicious frame is present.

2.2 Configuration of Fraud-Detection ECU 2100a

Figures 20, 21:
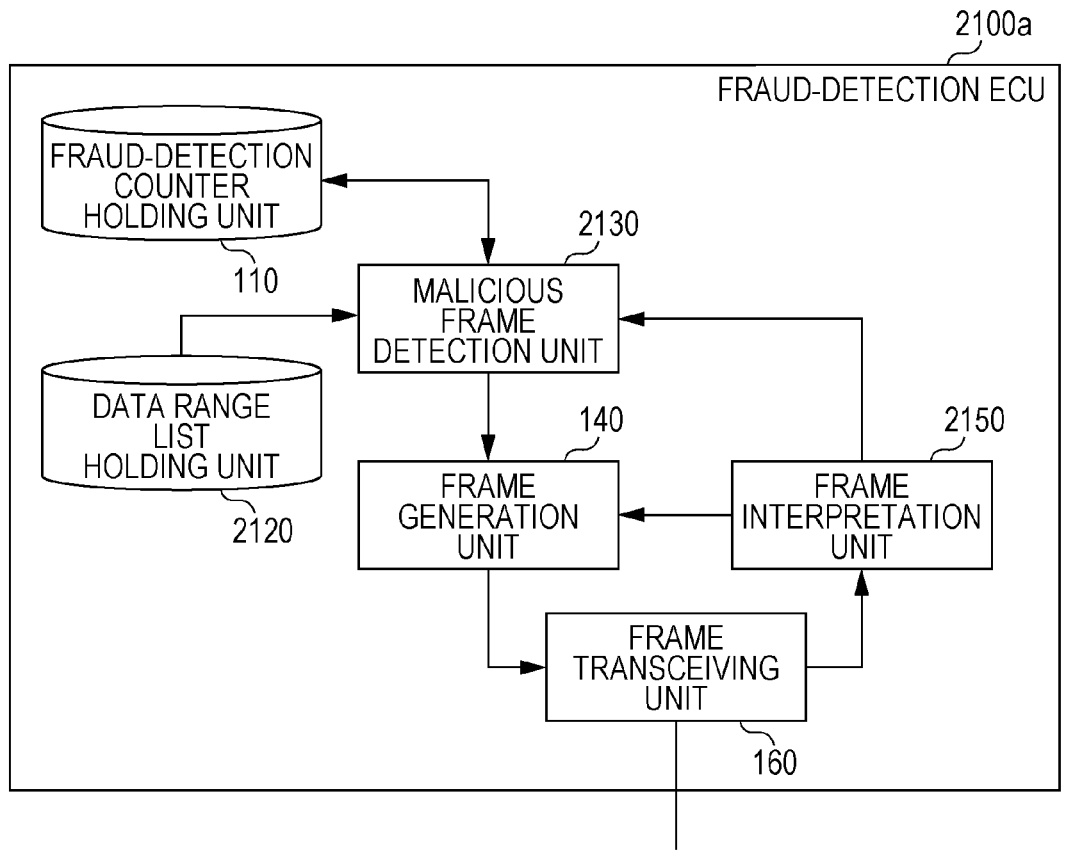
FIG. 20 is a configuration diagram of a fraud-detection ECU according to the second embodiment.
FIG. 21 is a diagram illustrating an example of a data range list held in the fraud-detection ECU.

FIG. 20 is a configuration diagram of the fraud-detection ECU 2100a. The fraud-detection ECU 2100a is configured to include a frame transceiving unit 160, a frame interpretation unit 2150, a malicious frame detection unit 2130, a data range list holding unit 2120, a fraud-detection counter holding unit 110, and a frame generation unit 140. These constituent elements are functional ones, and each of their functions is implemented by an element in the fraud-detection ECU 2100a, such as a communication circuit, a processor that executes a control program stored in a memory, or a digital circuit. The fraud-detection ECU 2100a is obtained by modifying part of the fraud-detection ECU 100a illustrated in the first embodiment, and constituent elements having functions similar to those in the first embodiment are designated by the same numerals and are not described. The fraud-detection ECU 2100b also has a configuration similar to that of the fraud-detection ECU 2100a.

The frame interpretation unit 2150 is obtained by modifying the frame interpretation unit 150 illustrated in the first embodiment, and is configured to receive values of a frame from the frame transceiving unit 160 and to interpret the values so as to map the values into the respective fields in the frame formats specified in the CAN protocol. The frame interpretation unit 2150 transfers a value (data) judged to correspond to the data field when the frame is judged to be a data frame, together with the ID (message ID) in the ID field, to the malicious frame detection unit 2130. Further, the frame interpretation unit 2150 notifies the frame generation unit 140 of a request to transmit an error frame if the frame is judged not to comply with the CAN protocol. Further, when an error frame is received, that is, when an error frame is interpreted to have started from a value in the received frame, the frame interpretation unit 2150 discards the subsequent part of the frame, that is, aborts interpretation of the frame.

The malicious frame detection unit 2130 is obtained by modifying the malicious frame detection unit 130 illustrated in the first embodiment, and is configured to receive the message ID and the value in the data field (data), which are sent from the frame interpretation unit 2150, and to determine whether or not these values meet a predetermined condition indicating fraud. That is, the malicious frame detection unit 2130 functions as a so-called determination unit that determines whether or not the content of a predetermined field in a received frame meets a predetermined condition indicating fraud. The predetermined condition indicating fraud is a condition in which the data is not within a data range listed in a data range list held in the data range list holding unit 2120 in association with the message ID. The malicious frame detection unit 2130 determines whether or not fraud has occurred, in accordance with a data range list held in the data range list holding unit 2120, which is a list defining data ranges for individual message IDs. If data in a range which is not defined in the data range list is received, the malicious frame detection unit 2130 notifies the fraud-detection counter holding unit 110 of the received message ID in order to increment the number of times fraud has been detected. The control performed to, when the number of times fraud has been detected reaches a certain number or more, transmit an error display message so that the error display message can be received by the head unit 200 has been described in the first embodiment, and is not described here. If data in a range which is not defined in the data range list is received, the malicious frame detection unit 2130 notifies the frame generation unit 140 of a request to transmit an error frame.

The data range list holding unit 2120 holds a data range list that is a list defining in advance ranges allowed for data (the values in the data fields) included in data frames transmitted on a bus in the in-vehicle network system 11 (see FIG. 21).

2.3 Example Data Range List

FIG. 21 is a diagram illustrating an example of the data range list held in the data range list holding unit 2120 of the fraud-detection ECU 2100a. In the data range list, each ID (message ID) is associated with a data range allowed as the value in the data field (data) in a data frame with the message ID. In the example illustrated in FIG. 21, the data range "0 to 180" is set to be normal for a data frame whose message ID is "1", the data range "0 to 100" for a data frame whose message ID is "2" or "4", and the data range "0, 1" for a data frame whose message ID is "3".

2.4 Sequence for Malicious-Frame Detection

A description will now be given of the operation of the fraud-detection ECU 2100a, the ECU 400a, the ECU 400b, the gateway 300, and so forth connected to the bus 500a in the in-vehicle network system 11 having the configuration described above in a case where a malicious ECU is connected to the bus 500a.

Figure 22:
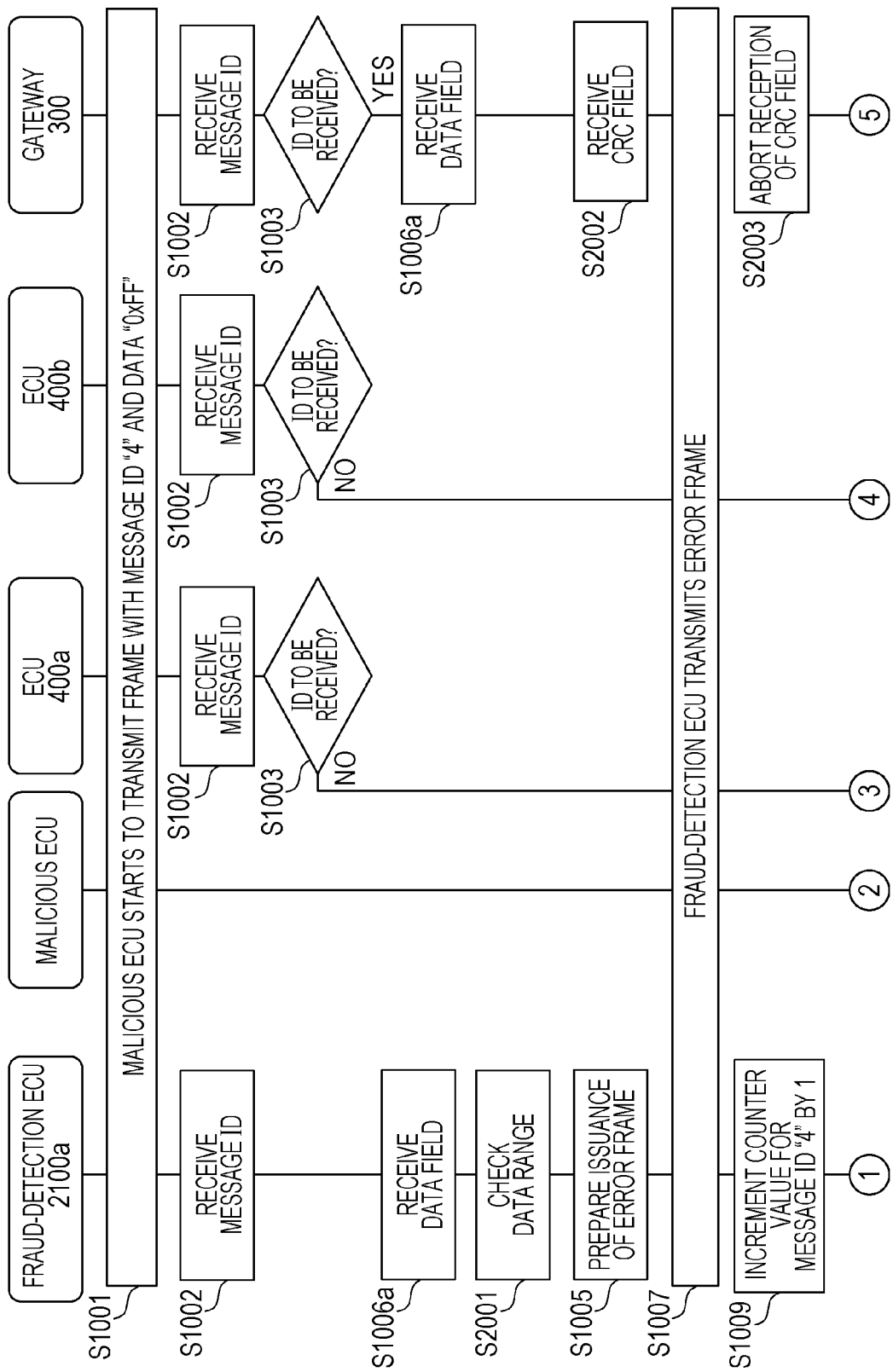
FIG. 22 is a sequence diagram illustrating an example operation for detecting a malicious frame and preventing execution of the malicious frame in the second embodiment (continued in FIG. 23)
Figure 23:
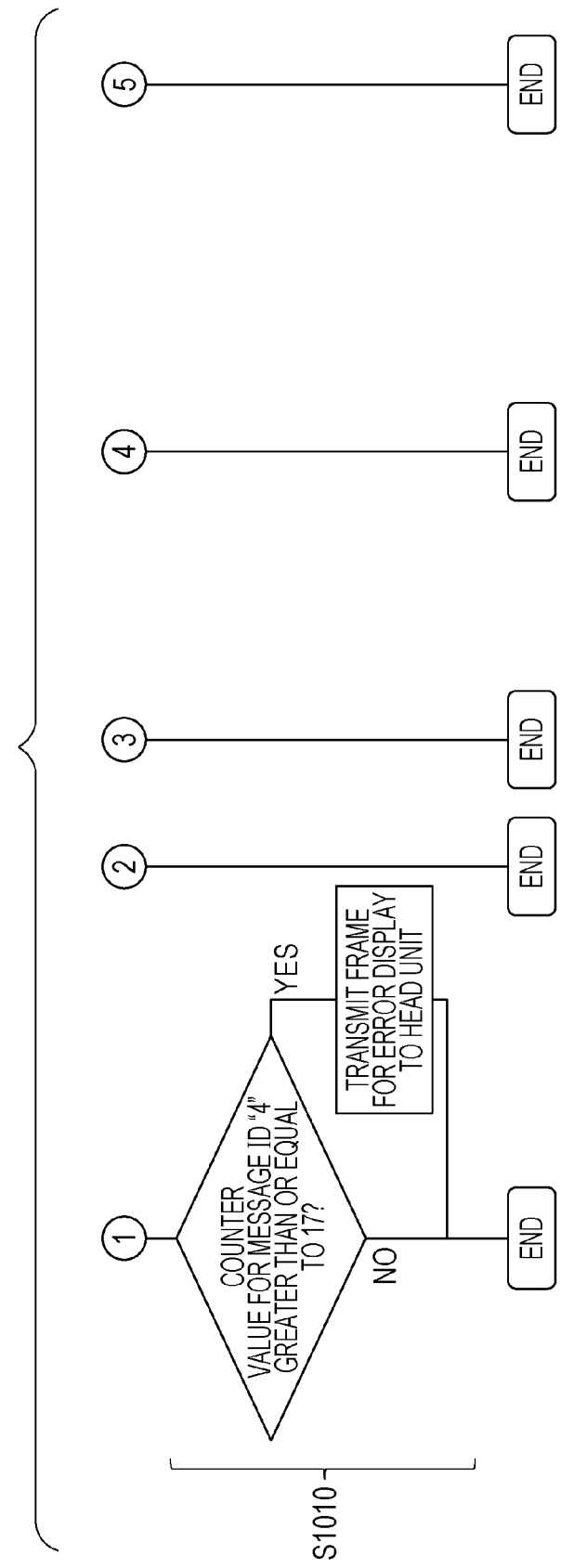
FIG. 23 is a sequence diagram illustrating the example operation for detecting a malicious frame and preventing execution of the malicious frame in the second embodiment (continued from FIG. 22)

FIG. 22 and FIG. 23 illustrate a sequence diagram illustrating an example operation for, in response to detection of a malicious frame (message) by the fraud-detection ECU 2100a, preventing any other ECU from performing a process corresponding to the malicious frame. In FIG. 22 and FIG. 23, as in FIG. 18 given in the first embodiment, an example is illustrated in which a malicious ECU transmits a data frame whose message ID is "4" and data field (data) is "255 (0xFF)" to the bus 500a. The same sequences as the sequences illustrated in the first embodiment are designated by the same numerals, and are described here in a simplified way.

First, a malicious ECU starts to transmit a malicious data frame (sequence S1001). Each of the fraud-detection ECU 2100a, the ECU 400a, the ECU 400b, and the gateway 300 receives a message ID (sequence S1002). Each of the ECU 400a, the ECU 400b, and the gateway 300 checks the message ID by using the reception-ID list held therein (sequence S1003). The ECU 400a and the ECU 400b terminate reception since the respectively held reception-ID lists do not include "4" (see FIG. 9). The gateway 300 continues reception and receives the data field since the held reception-ID list includes "4" (see FIG. 5) (sequence S1006a). Likewise, the fraud-detection ECU 2100a also receives the data field (sequence S1006a).

Subsequently to sequence S1006a, the fraud-detection ECU 2100a checks the data in the data field by using the data range list (see FIG. 21) (sequence S2001). That is, the fraud-detection ECU 2100a determines whether or not the content of the ID field in the transmitted frame meets a predetermined condition (in which the content is not within the ranges of data contained in the data range list) indicating fraud. The fraud-detection ECU 2100a judges that the data frame is malicious since the data range list does not contain the value of "255 (0xFF)" corresponding to the ID "4", and then starts to prepare the issuance of an error frame (sequence S1005).

While the fraud-detection ECU 2100a is preparing the issuance of an error frame, the CRC field (the CRC sequence and the CRC delimiter), which is a part subsequent to the data field, is sequentially delivered bit-by-bit to the bus 500a from the malicious ECU. The gateway 300 starts the reception of the CRC field (sequence S2002).

Then, the preparation of the issuance of an error frame is completed, and the fraud-detection ECU 2100a transmits an error frame (sequence S1007). The transmission of the error frame is started, thus allowing the middle part of the CRC sequence in the frame being transmitted from the malicious ECU to be overwritten with the error frame (a bit sequence of the prioritized dominant value) on the bus 500a.

Upon receipt of the error frame transmitted in sequence S1007, the gateway 300 aborts reception of the data frame being transmitted from the malicious ECU during the reception of the CRC field including the CRC sequence (sequence S2003). That is, the CRC sequence from the malicious ECU has been overwritten with the error frame, and the gateway 300 detects the error frame and thus does not continue the reception of the data frame being transmitted from the malicious ECU.

The fraud-detection ECU 2100a Increments the fraud-detection counter corresponding to the ID "4" of the data frame for which the error frame has been transmitted (sequence S1009). If the fraud-detection counter corresponding to the ID "4" becomes greater than or equal to 17 as a result of the increment, the fraud-detection ECU 2100a transmits an error display message (sequence S1010).

2.5 Advantageous Effects of Second Embodiment

A fraud-detection ECU illustrated in the second embodiment determines whether a transmitted frame is a malicious frame or not by using a data range list in terms of the ID field and the data field in the frame (data frame). This enables fraud to be determined based on a combination of the ID field and the data field in a data frame, and can thus prevent existing ECUs (that is, ECUs other than a fraud-detection ECU and a malicious ECU) from interpreting a malicious frame and from performing a process corresponding to the frame. In addition, it is only required to receive the portion up to the data field of the data frame to perform determination. This makes it possible to reduce bus traffic, compared to the case where determination is performed after the receipt of the latter part of the data frame.

In addition, the fraud-detection ECU counts the number of times an error frame has been transmitted, by using fraud-detection counters, and can thus detect that a transmission error counter in a node that transmits a malicious message ID has reached an upper limit value at which the transition to the passive state is required according to the CAN protocol in response to receipt of an error frame. This makes it possible to determine whether or not a node that transmits a malicious message ID is compatible with the specification of an error counter in the CAN protocol.

In addition, the use of only a fraud-detection ECU as a node for determining the presence of a malicious frame can minimize the effect on the existing network configuration, resulting in the amount of processing and the amount of power consumption being reduced in the entire system.

Third Embodiment

An embodiment of the present disclosure will now be described in the context of an in-vehicle network system 12 including a fraud-detection ECU that implements an anti-fraud method for preventing a process based on a malicious frame from being executed on any other node (ECU) by using a message authentication code (MAC) calculated based on a message ID, data, and a counter value.

3.1 Overall Configuration of In-Vehicle Network System 12

Figure 24:
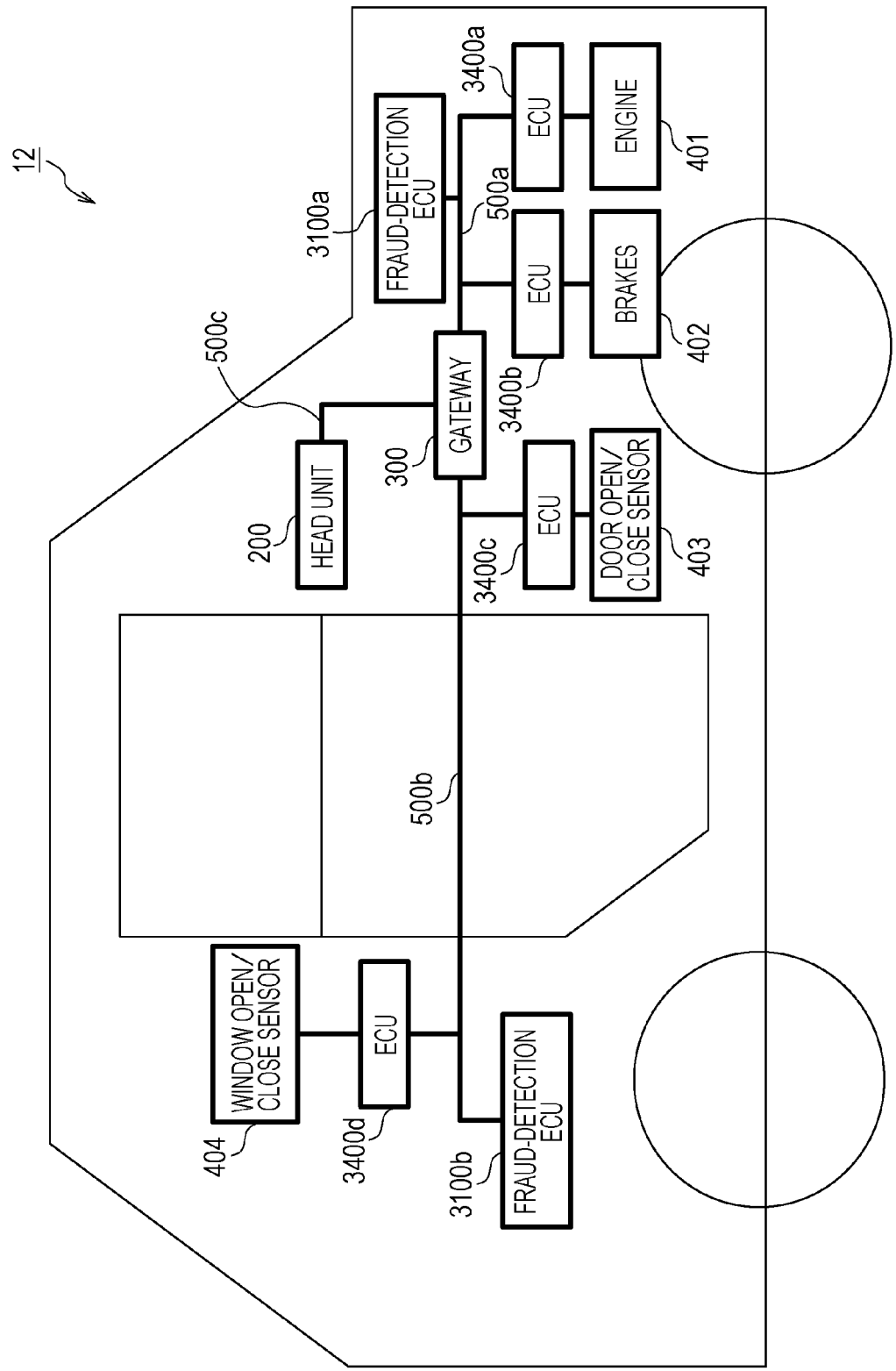
FIG. 24 is a diagram illustrating an overall configuration of an in-vehicle network system according to a third embodiment.

FIG. 24 is a diagram illustrating an overall configuration of an in-vehicle network system 12 according to a third embodiment. The in-vehicle network system 12 is obtained by modifying part of the in-vehicle network system 10 illustrated in the first embodiment. The in-vehicle network system 12 is configured to include buses 500a to 500c, fraud-detection ECUs 3100a and 3100b, a head unit 200, a gateway 300, and nodes connected to the buses, called ECUs, such as ECUs 3400a to 3400d connected to various devices. Of the constituent elements of the in-vehicle network system 12, constituent elements having functions similar to those in the first embodiment are designated by the same numerals and are not described.

The fraud-detection ECUs 3100a and 3100b are ECUs connected to the bus 500a and the bus 500b, respectively, and having a function of determining whether frames transmitted from the ECUs 3400a to 3400d, etc. are malicious or not and transmitting an error frame if a malicious frame is present.

The ECUs 3400a to 3400d are each connected to any bus, and are connected to the engine 401, the brakes 402, the door open/close sensor 403, and the window open/close sensor 404, respectively. Each of the ECUs 3400a to 3400d obtains the state of the device connected thereto (such as the engine 401), and periodically transmits a data frame indicating the state to a network (that is, the bus). The data frame to be transmitted has a data field which is assigned a message authentication code (MAC) derived from a message ID, a data value, and a counter value incremented for each transmission through computation.

3.2 Configuration of ECU 3400a

Figure 25:
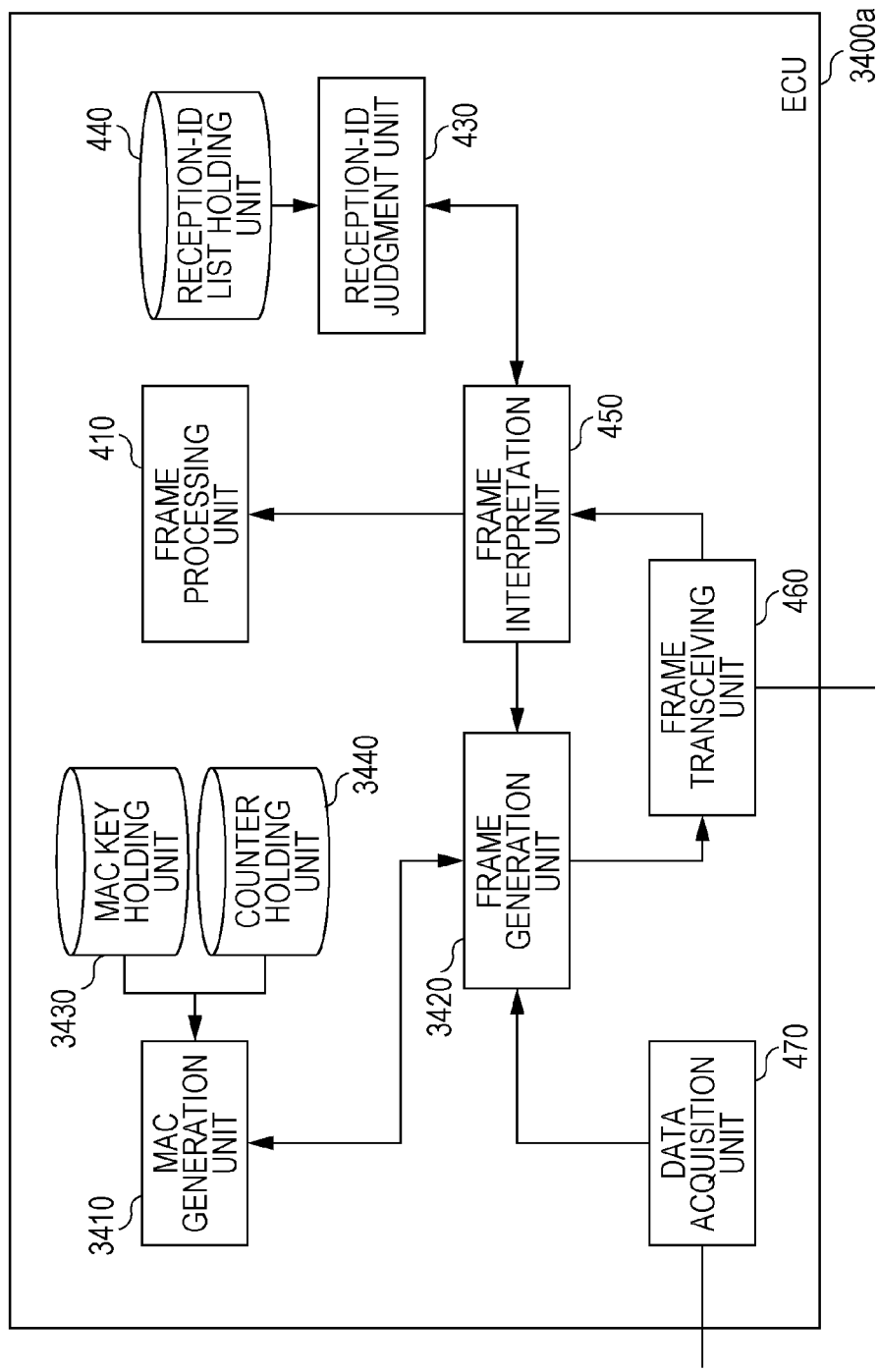
FIG. 25 is a configuration diagram of an ECU according to the third embodiment.

FIG. 25 is a configuration diagram of the ECU 3400a. The ECU 3400a is configured to include a frame transceiving unit 460, a frame interpretation unit 450, a reception-ID judgment unit 430, a reception-ID list holding unit 440, a frame processing unit 410, a frame generation unit 3420, a data acquisition unit 470, a MAC generation unit 3410, a MAC key holding unit 3430, and a counter holding unit 3440. These constituent elements are functional ones, and each of their functions is implemented by an element in the ECU 3400a, such as a communication circuit, a processor that executes a control program stored in a memory, or a digital circuit. The ECU 3400a is obtained by modifying part of the ECU 400a illustrated in the first embodiment, and constituent elements having functions similar to those in the first embodiment are designated by the same numerals and are not described.

The frame generation unit 3420 is obtained by modifying part of the frame generation unit 420 illustrated in the first embodiment. In accordance with a notification of instructions to transmit an error frame, which is sent from the frame interpretation unit 450, the frame generation unit 3420 forms an error frame and notifies the frame transceiving unit 460 of the error frame for transmission. Further, the frame generation unit 3420 notifies the MAC generation unit 3410 of the value of the data sent from the data acquisition unit 470 and a predetermined message ID, and receives a calculated MAC. The frame generation unit 3420 forms a frame in such a manner that the frame includes the predetermined message ID, the value of the data sent from the data acquisition unit 470, and the MAC received from the MAC generation unit 3410 (see FIG. 26), and notifies the frame transceiving unit 460 of the frame.

The MAC generation unit 3410 calculates (derives through computation) a MAC by using a MAC key held in the MAC key holding unit 3430 for a value (composite value) obtained by combining the message ID and the value of the data, which are sent from the frame generation unit 3420, with a counter value held in the counter holding unit 3440, and notifies the frame generation unit 3420 of the MAC obtained as a result of the calculation. Here, Hash-based Message Authentication Code (HMAC) (see RFC 2104 HMAC: Keyed-Hashing for Message Authentication) is adopted as a MAC computation method, and the first 4 bytes of a value obtained as a result of the computation with a value obtained by padding the composite value described above to a predetermined block (for example, 4 bytes) using a MAC key are regarded as a MAC. While the composite value used for calculating a MAC uses here a message ID, the value of data, and a counter value held in the counter holding unit 3440, any one or a combination of two of these three values may be used to calculate a MAC.

The MAC key holding unit 3430 holds a MAC key necessary for computing a MAC.

The counter holding unit 3440 holds a counter value necessary for computing a MAC. The counter value is incremented each time a data frame is correctly transmitted from the frame transceiving unit 460.

The ECUs 3400b to 3400d are obtained by modifying part of the ECUs 400b to 400d illustrated in the first embodiment, respectively, and each have a configuration basically similar to that of the ECU 3400a described above. However, the reception-ID list held in the reception-ID list holding unit 440 may have content different from one ECU to another. For example, the ECU 3400a and the ECU 3400b hold the reception-ID list illustrated by way of example in FIG. 9, and the ECU 3400c and the ECU 3400d hold the reception-ID list illustrated by way of example in FIG. 5. In addition, as illustrated in the first embodiment, the content of the process of the frame processing unit 410 differs from one ECU to another. The content of frames respectively transmitted from the ECUs 3400a to 3400d will now be described with reference to FIGS. 26 to 29.

3.3 Example Transmission Frame from Engine-Related ECU 3400a

FIG. 26 is a diagram illustrating an example of an ID (message ID) and a data field (data) in a data frame transmitted from the ECU 3400a connected to the engine 401. The ECU 3400a transmits a frame whose message ID is "1". In this figure, the data is delimited with spaces in blocks of 1 byte, in which the first 1 byte represents the average speed per hour (km/h), the following 1 byte represents the counter value, and the following 4 bytes represent the MAC. In the example illustrated in FIG. 26, the MAC is expressed in hexadecimal form. The average speed per hour (km/h) in the first 1 byte takes a value in the range from a minimum speed of 0 (km/h) to a maximum speed of 180 (km/h). FIG. 26 illustrates, from top to bottom, message IDs and data corresponding to frames transmitted sequentially from the ECU 3400a, by way of example, and depicts a gradual increase in counter value and acceleration, increasing the average speed per hour from 0 km/h in increments of 1 km/h.

3.4 Example Transmission Frame from Brake-Related ECU 3400b

FIG. 27 is a diagram illustrating an example of an ID (message ID) and a data field (data) in a data frame transmitted from the ECU 3400b connected to the brakes 402. The ECU 3400b transmits a frame whose message ID is "2". In this figure, the data is delimited with spaces in blocks of 1 byte, in which the first 1 byte represents the degree to which the brakes are applied, expressed as a percentage (%), the following 1 byte represents the counter value, and the following 4 bytes represent the MAC. In the example illustrated in FIG. 27, the MAC is expressed in hexadecimal form. In the degree to which the brakes are applied in the first 1 byte, a state where the brakes are not applied at all is represented by 0(%) and a state where the brakes are maximally applied is represented by 100(%). FIG. 27 illustrates, from top to bottom, message IDs and data corresponding to frames transmitted sequentially from the ECU 3400b, by way of example, and depicts a gradual increase in counter value and a gradual easing off of the brakes from 100%.

3.5 Example Transmission Frame from Door-Open/Close-Sensor-Related ECU 3400c FIG. 28 is a diagram illustrating an example of an ID (message ID) and a data field (data) in a data frame transmitted from the ECU 3400c connected to the door open/close sensor 403. The ECU 3400c transmits a frame whose message ID is "3". In this figure, the data is delimited with spaces in blocks of 1 byte, in which the first 1 byte represents the open or closed state for the door, the following 1 byte represents the counter value, and the following 4 bytes represent the MAC. In the example illustrated in FIG. 28, the MAC is expressed in hexadecimal form. In the open or closed state for the door in the first 1 byte, the door-open state is represented by "1" and the door-closed state is represented by "0". FIG. 28 illustrates, from top to bottom, message IDs and data corresponding to frames transmitted sequentially from the ECU 3400c, by way of example, and depicts a gradual increase in counter value and a gradual transition from the door-open state to the closed state.

Figures 29, 30:
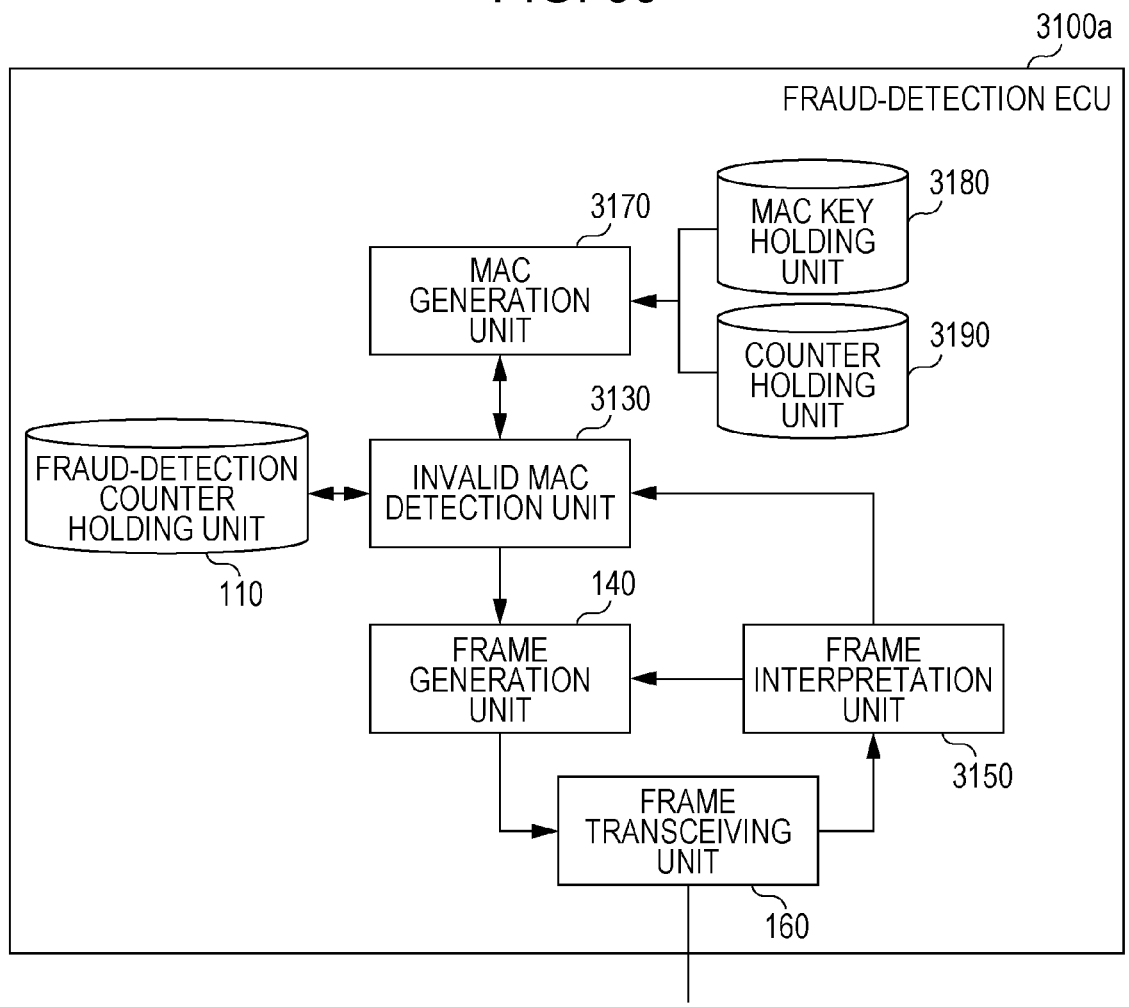
FIG. 29 is a diagram illustrating an example of an ID and a data field in a data frame transmitted from an ECU connected to a window open/close sensor.
FIG. 30 is a configuration diagram of a fraud-detection ECU according to the third embodiment.

3.6 Example Transmission Frame from Window-Open/Close-Sensor-Related ECU 3400d FIG. 29 is a diagram illustrating an example of an ID (message ID) and a data field (data) In a data frame transmitted from the ECU 3400d connected to the window open/close sensor 404. The ECU 3400d transmits a frame whose message ID is "4". In this figure, the data is delimited with spaces in blocks of 1 byte, in which the first 1 byte represents the open or closed state for the window, expressed as a percentage (%), the following 1 byte represents the counter value, and the following 4 bytes represent the MAC. In the example illustrated in FIG. 29, the MAC is expressed in hexadecimal form. In the open or closed state for the window in the first 1 byte, a state where the window is completely closed is represented by 0(%) and a state where the window is completely open is represented by 100(%). FIG. 29 illustrates, from top to bottom, message IDs and data corresponding to frames transmitted sequentially from the ECU 3400d, by way of example, and depicts a gradual increase in counter value and a gradual transition from the window-closed state to the open state.

3.7 Configuration of Fraud-Detection ECU 3100a

FIG. 30 is a configuration diagram of the fraud-detection ECU 3100a. The fraud-detection ECU 3100a is constituted by a frame transceiving unit 160, a frame interpretation unit 3150, an invalid MAC detection unit 3130, a MAC key holding unit 3180, a counter holding unit 3190, a frame generation unit 140, a MAC generation unit 3170, and a fraud-detection counter holding unit 110. These constituent elements are functional ones, and each of their functions is implemented by an element in the fraud-detection ECU 3100a, such as a communication circuit, a processor that executes a control program stored in a memory, or a digital circuit. The fraud-detection ECU 3100a is obtained by modifying part of the fraud-detection ECU 100a illustrated in the first embodiment, and constituent elements having functions similar to those in the first embodiment are designated by the same numerals and are not described. The fraud-detection ECU 3100b also has a similar configuration.

The frame interpretation unit 3150 is obtained by modifying the frame interpretation unit 150 illustrated in the first embodiment, and is configured to receive values of a frame from the frame transceiving unit 160 and to interpret the values so as to map the values into the respective fields in the frame formats specified in the CAN protocol. The frame interpretation unit 3150 transfers a value (data) judged to correspond to the data field when the frame is judged to be a data frame, together with the ID (message ID) In the ID field, to the invalid MAC detection unit 3130. Further, the frame interpretation unit 3150 notifies the frame generation unit 140 of a request to transmit an error frame if the frame is judged not to comply with the CAN protocol. Further, when an error frame is received, that is, when an error frame is interpreted to have started from a value in the received frame, the frame interpretation unit 3150 discards the subsequent part of the frame, that is, aborts interpretation of the frame.

The invalid MAC detection unit 3130 has a function of receiving the message ID and the value in the data field (data), which are sent from the frame interpretation unit 3150, and verifying the MAC in the data field. The invalid MAC detection unit 3130 notifies the MAC generation unit 3170 of the message ID and the value in the data field, which have been sent, and acquires a MAC generated by the MAC generation unit 3170. The invalid MAC detection unit 3130 determines whether or not the data in the data field meets a predetermined condition indicating fraud. That is, the invalid MAC detection unit 3130 functions as a so-called determination unit that determines whether or not the content of a predetermined field in a received frame meets a predetermined condition indicating fraud. The predetermined condition indicating fraud is failure of verification in a preset verification process procedure (a procedure including the generation of a MAC, the comparison of MACs, and so forth), that is, a condition in which the MAC included in the data does not match the MAC generated by the MAC generation unit 3170. The invalid MAC detection unit 3130 compares the MAC acquired from the MAC generation unit 3170 with the MAC in the data field to determine whether or not fraud has occurred (that is, verify the MAC). If a match is not found as a result of the comparison between the values of the two MACs, the invalid MAC detection unit 3130 notifies the fraud-detection counter holding unit 110 of the received message ID in order to increment the number of times fraud has been detected. The control performed to, when the number of times fraud has been detected reaches a certain number or more, transmit an error display message so that the error display message can be received by the head unit 200 has been described in the first embodiment, and is not described here. If a match is not found as a result of the comparison between the values of the two MACs, furthermore, the invalid MAC detection unit 3130 notifies the frame generation unit 140 of a request to transmit an error frame. If a match is found as a result of the comparison between the MAC values, the invalid MAC detection unit 3130 notifies the MAC generation unit 3170 of a request to increment the counter value corresponding to the message ID, which is held in the counter holding unit 3190.

The MAC generation unit 3170 acquires the corresponding MAC key from the MAC key holding unit 3180 by using the message ID sent from the invalid MAC detection unit 3130, and acquires the corresponding counter from the counter holding unit 3190. The MAC generation unit 3170 calculates (derives through computation) a MAC by using the MAC key acquired from the MAC key holding unit 3180 for the value in the data field (the value in the first 1 byte) sent from the invalid MAC detection unit 3130 and the counter value acquired from the counter holding unit 3190, and notifies the invalid MAC detection unit 3130 of the calculated MAC. The fraud-detection ECUs 3100a and 3100b and the ECUs 3400a to 3400d use the same algorithm to calculate a MAC by using a MAC key.

The MAC key holding unit 3180 holds a MAC key necessary for computing a MAC in association with each message ID. The MAC keys held in the MAC key holding unit 3180 have different values for the respective message IDs associated therewith. If it is assumed that a single transmitting node transmits frames each corresponding to one of a plurality of message IDs, MAC keys used for ECUs and fraud-detection ECUs may be keys different for each transmitting node. The MAC keys may also be configured such that, for example, the same value is used for frames to be transmitted on the same bus, the same key (value) is used even on different buses, the same key is used per vehicle, the same key is used for the same type of vehicle, the same key is used for each same producer, or the same key is used for different producers.

The counter holding unit 3190 holds, for each message ID, a counter value necessary for computing a MAC value. The counter value is incremented when a frame is correctly received (that is, when the MACs match as a result of comparison by the invalid MAC detection unit 3130).

3.8 Example of Counter Values

Figure 31:
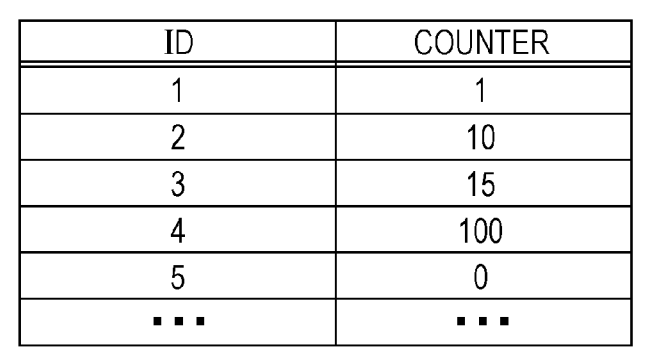

FIG. 31 is a diagram illustrating an example of counter values for the individual message IDs held in the counter holding unit 3190. In this figure, the counter for which the message ID is "1" indicates 1 count, the counter for which the message ID is "2" indicates 10 counts, the counter for which the message ID is "3" indicates 15 counts, and the counter for which the message ID is "4" indicates 100 counts. The counter value corresponding to each of the message IDs represents the number of times a frame including the message ID has been correctly received.

3.9 Sequence for Malicious-Frame Detection

A description will now be given of the operation of the fraud-detection ECU 3100a, the ECU 3400a, the ECU 3400b, the gateway 300, and so forth connected to the bus 500a In the in-vehicle network system 12 having the configuration described above in a case where a malicious ECU is connected to the bus 500a.

Figure 32:
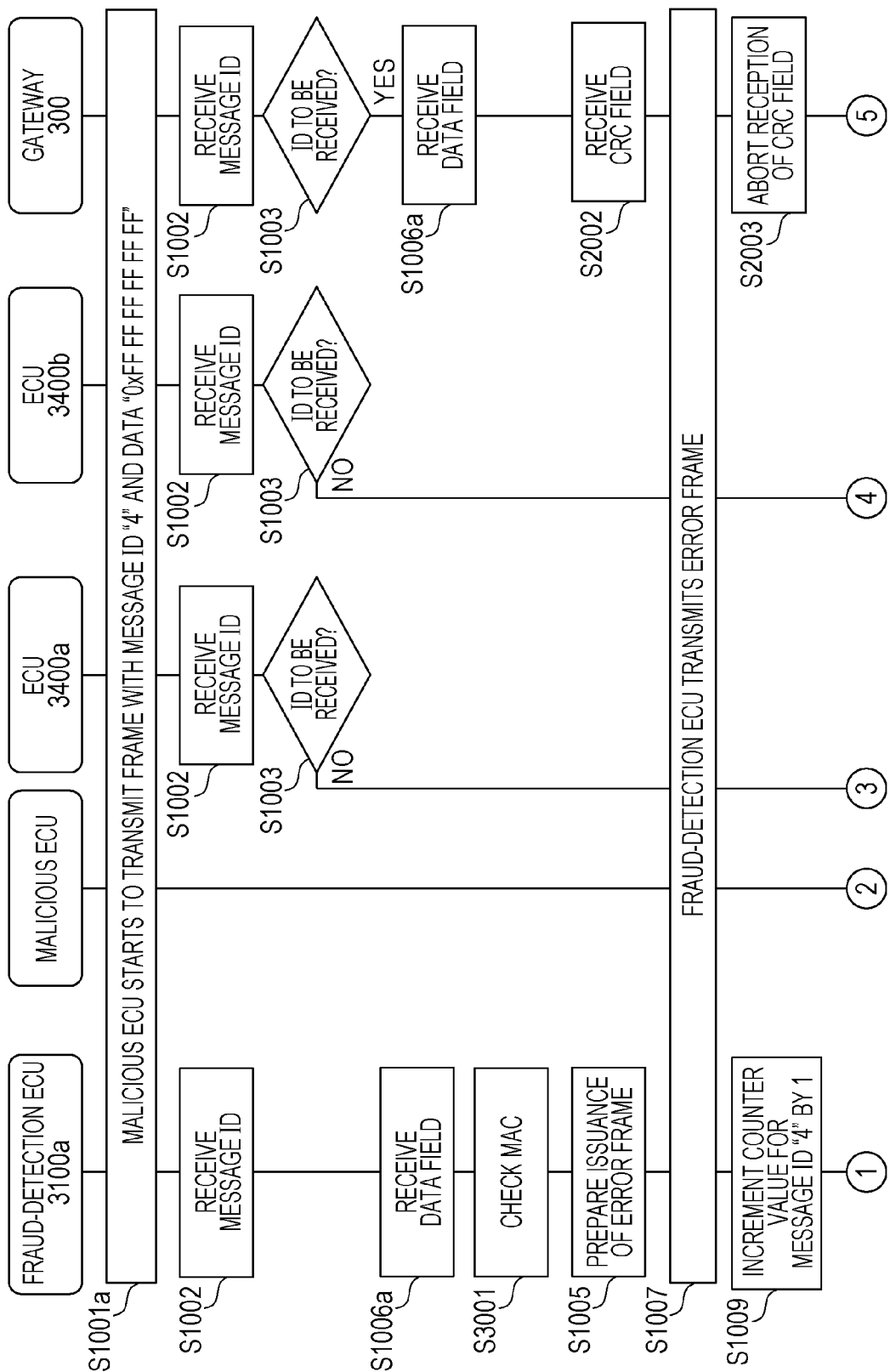
FIG. 32 is a sequence diagram illustrating an example operation for detecting a malicious frame and preventing execution of the malicious frame in the third embodiment (continued in FIG. 33)
Figure 33:
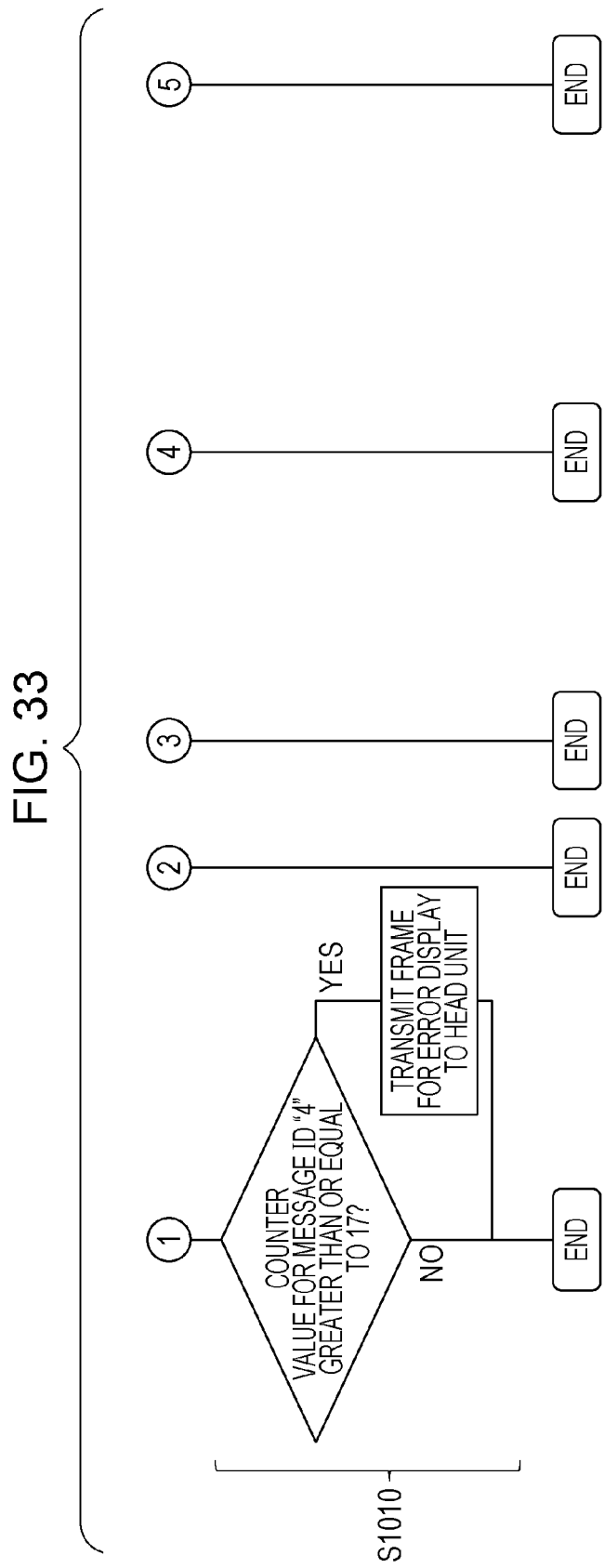
FIG. 33 is a sequence diagram illustrating the example operation for detecting a malicious frame and preventing execution of the malicious frame in the third embodiment (continued from FIG. 32).

FIG. 32 and FIG. 33 illustrate a sequence diagram illustrating an example operation for, in response to detection of a malicious frame (message) by the fraud-detection ECU 3100a, preventing any other ECU from performing a process corresponding to the malicious frame. In FIG. 32 and FIG. 33, as in FIG. 18 given in the first embodiment and FIG. 22 and FIG. 23 given in the second embodiment, an example is illustrated in which a malicious ECU is connected to the bus 500a. This malicious ECU transmits a data frame whose message ID is "4" and data field (data) is "0xFF FF FF FF FF FF" (6 bytes). The same sequences as the sequences illustrated in the first embodiment or 2 are designated by the same numerals, and are described here in a simplified way.

First, a malicious ECU starts to transmit the malicious data frame described above (sequence S1001a). Each of the fraud-detection ECU 3100a, the ECU 3400a, the ECU 3400b, and the gateway 300 receives a message ID (sequence S1002). Each of the ECU 3400a, the ECU 3400b, and the gateway 300 checks the message ID by using the reception-ID list held therein (sequence S1003). The ECU 3400a and the ECU 3400b terminate reception since the respectively held reception-ID lists do not include "4" (see FIG. 9). The gateway 300 continues reception and receives the data field since the held reception-ID list includes "4" (see FIG. 5) (sequence S1006a). Likewise, the fraud-detection ECU 3100a also receives the data field (sequence S1006a).

Subsequently to sequence S1006a, the fraud-detection ECU 3100a verifies (checks) the MAC included in the data in the data field (sequence S3001). That is, the fraud-detection ECU 3100a determines whether or not the content of the ID field in the transmitted frame meets a predetermined condition (failure of verification of the MAC) indicating fraud. The fraud-detection ECU 3100a verifies the MAC by comparing the MAC, which is the last 4 bytes for the 6-byte data "0xFF FF FF FF FF FF" in the data field in the data frame transmitted from the malicious ECU, with a MAC determined by using the MAC key and the counter corresponding to the message ID "4". Here, a match is not found as a result of the comparison and verification fails. Thus, the fraud-detection ECU 3100a judges that the data frame is malicious, and then starts to prepare the issuance of an error frame (sequence S1005).

While the fraud-detection ECU 3100a is preparing the issuance of an error frame, the gateway 300 starts the reception of the CRC field (sequence S2002).

Then, the preparation of the issuance of an error frame is completed, and the fraud-detection ECU 3100a transmits an error frame (sequence S1007). The transmission of the error frame is started, thus allowing the middle part of the CRC sequence in the frame being transmitted from the malicious ECU to be overwritten with the error frame on the bus 500a.

Upon receipt of the error frame transmitted in sequence S1007, the gateway 300 aborts reception of the data frame being transmitted from the malicious ECU during the reception of the CRC field including the CRC sequence (sequence S2003).

The fraud-detection ECU 3100a increments the fraud-detection counter corresponding to the ID "4" of the data frame for which the error frame has been transmitted (sequence S1009). If the fraud-detection counter corresponding to the ID "4" becomes greater than or equal to 17 as a result of the increment, the fraud-detection ECU 3100a transmits an error display message (sequence S1010).

3.10 Advantageous Effects of Third Embodiment

A fraud-detection ECU illustrated in the third embodiment determines whether a transmitted frame is a malicious frame or not by verifying a MAC included in a data field of a frame (data frame). This can prevent existing ECUs (that is, ECUs other than a fraud-detection ECU and a malicious ECU) from interpreting a malicious frame and from performing a process corresponding to the frame. In addition, it is only required to receive the portion up to the data field of the data frame to perform determination. This makes it possible to reduce bus traffic, compared to the case where determination is performed after the receipt of the latter part of the data frame.

In addition, the fraud-detection ECU counts the number of times an error frame has been transmitted, by using fraud-detection counters, and can thus detect that a transmission error counter in a node that transmits a malicious message ID has reached an upper limit value at which the transition to the passive state is required according to the CAN protocol in response to receipt of an error frame. This makes it possible to determine whether or not a node that transmits a malicious message ID is compatible with the specification of an error counter in the CAN protocol.

In addition, the use of only a fraud-detection ECU as a node for the verification of a MAC can eliminate the need for an ECU other than the fraud-detection ECU to perform verification, resulting in the amount of processing and the amount of power consumption being reduced in the entire system.

Other Embodiments

As described above, the first to third embodiments have been described as illustrative examples of the technique according to the present disclosure. However, the technique according to the present disclosure is not limited to these embodiments and is also applicable to embodiments in which modifications, replacements, additions, omissions, and others are made as desired. For example, the following modifications are also included in embodiments of the present disclosure.

(1) While the embodiments described above provide an example in which frames are periodically transmitted from the ECUs 400a to 400d or the ECUs 3400a to 3400d, each frame may be transmitted as an event that provides notification of a state change. For example, each ECU may transmit a frame only when the open or closed state for the door is changed, rather than periodically transmitting the open or closed state for the door. Alternatively, each ECU may periodically transmit a frame and also transmit a frame when a state change occurs.

(2) While the third embodiment provides an example in which a MAC is calculated based on a data value and a counter value, a MAC may be calculated based on only a data value. Alternatively, a MAC may be calculated based on only a counter value. Furthermore, the size of the MAC included in a frame is not limited to 4 bytes and may be different from one transmission to another. Likewise, the size of the data value, such as the average speed per hour, and the size of the counter value are also not limited to 1 byte. In addition, each frame may not necessarily include a counter value.

(3) While the third embodiment provides an example in which a counter value is Incremented for each transmission, the counter value may be a value that is incremented automatically with time. Alternatively, the value of the point in time itself may be used instead of that of a counter. That is, generation of a MAC based on a variable changing each time a data frame is transmitted (such as a counter or a point in time) can make malicious interpretation of the MAC difficult. In the third embodiment, furthermore, the MAC generation unit 3170 in a fraud-detection ECU calculates a MAC value by using a message ID, the first 1 byte in the data field, and a counter value in the counter holding unit 3190. Instead of this, a MAC value may be calculated by using a message ID, the first 1 byte in the data field, and a counter value that is the following 1 byte in the data field. In addition, a counter value in the counter holding unit 3190 may be updated so as to match the counter value in a data field determined not to be malicious.

(4) In the embodiments described above, a data frame in the CAN protocol is configured in the standard ID format. The data frame may be in an extended ID format. In the extended ID format, an ID (message ID) is expressed in 29 bits in which the base ID at the ID position in the standard ID format and an ID extension are combined. This 29-bit ID may be handled as an ID (message ID) in the embodiments described above.

(5) In the embodiments described above, HMAC is used as a MAC calculation algorithm. Alternatively, Cipher Block Chaining Message Authentication Code (CBC-MAC) or Cipher-based MAC (CMAC) may be used. In addition, padding used in MAC computation may be any type of padding in which the data size of a block is necessary for computation, such as zero padding or that in ISO 10126, PKCS #1, PKCS #5, or PKCS #7. Furthermore, also in the method of changing the size to that of a block such as 4 bytes, padding may be provided either at the beginning, end, or in the middle. Furthermore, data used for MAC calculation may not necessarily be data that is consecutive (for example, continuous data of 4 bytes), but may be a composite one configured through bit-by-bit collection in accordance with a specific rule.

(6) In the embodiments described above, an in-vehicle network is given as an example of a network communication system in which communication is established in accordance with the CAN protocol. The technique according to the present disclosure is not limited to an in-vehicle network, and is also applicable to networks for robots, industrial devices, and so forth and network communication systems, other than an in-vehicle network, in which communication is established in accordance with the CAN protocol. In addition, the CAN protocol should be handled as having a broad meaning including CANOpen, which is used for embedded systems and the like in automation systems, or also including its derivative protocols, such as time-triggered CAN (TTCAN) and CAN with Flexible Data Rate (CAN FD).

(7) While the embodiments described above provide an example in which a malicious ECU is connected to a bus, existing ECUs such as the ECUs 400a to 400d or the ECUs 3400a to 3400d may act as malicious ECUs for some reason. Even in this case, as illustrated in the embodiments described above, a fraud-detection ECU appropriately detects a malicious frame and transmits an error frame, preventing any other ECU from processing the malicious frame.

(8) In the second embodiment, a data range list in which message IDs and allowed data ranges are associated with each other is used for determination of whether or not fraud has occurred based on whether or not data of a received data frame is included in a data range allowed for each message ID. Alternatively, a data range (for example, "0 to 180") allowed in common for any message ID may be defined without any message ID being included in the data range list, and determination of whether or not fraud has occurred may be performed regardless of the message ID. In addition, a data range list held in a fraud-detection ECU may be configured such that message IDs that may be transmitted on a bus to which the fraud-detection ECU is connected are associated with data ranges. Accordingly, the data range list can also be used as the authorized-ID list illustrated in the first embodiment. Using this, a fraud-detection ECU illustrated in the second embodiment may also check (sequence S1004) a message ID illustrated in the first embodiment.

(9) Instead of a data range list illustrated in the second embodiment in which message IDs and allowed data ranges are associated with each other, a data length list in which message IDs and allowed data lengths are associated with each other may be used by a fraud-detection ECU. In this case, the fraud-detection ECU determines whether or not the value of the control field in a received data frame meets a predetermined condition indicating fraud. The predetermined condition indicating fraud is a condition in which the data length (DLC) in the control field is not a data length associated with a message ID in the data length list. The fraud-detection ECU determines whether or not fraud has occurred based on whether or not the received DCL is a data length allowed for each message ID in the data length list.

(10) While the embodiments described above focus in particular on a data frame, it is also possible for a fraud-detection ECU to detect certain fraud in a remote frame. For example, the fraud-detection ECU may determine whether the message ID in a received remote frame is malicious or not by using the authorized-ID list illustrated in the first embodiment. Alternatively, the fraud-detection ECU may determine whether or not fraud has occurred on the basis of whether or not the data length (DLC) in the control field in a received remote frame is a data length allowed for each message ID by using the data length list described above. In addition, an error frame transmitted when a fraud-detection ECU illustrated in the embodiments described above detects fraud upon receiving a malicious frame is desirably transmitted rapidly after the detection of the fraud. It is useful that a fraud-detection ECU transmit an error frame, after the detection of a fraud, before the end of the CRC sequence in the malicious frame is transmitted. Accordingly, any other ECU detects an error frame or detects an error by checking a CRC, and aborts processing of the malicious frame. Similarly to the data frame, the remote frame also includes a message ID, a control field, and a CRC sequence.

(11) In the embodiments described above, a fraud-detection ECU transmits an error display message under a certain condition. Alternatively, no error display message may be transmitted. In this case, ECUs such as a gateway and a head unit do not need to hold a configuration (such as a reception-ID list for receiving an error display message) corresponding to that of a fraud-detection ECU, in particular. A fraud-detection ECU may provide an error notification instead of transmitting an error display message in a case where the fraud-detection ECU includes a speaker, a display, or the like, or may record a log of an error on a storage medium or the like.

(12) The malicious frame detection unit and the invalid MAC detection unit illustrated in the embodiments described above may be implemented by hardware called a CAN controller or by firmware running on a processor that operates when connected to the CAN controller. In addition, the MAC key holding unit, the counter holding unit, the authorized-ID list holding unit, and the data range list holding unit may be stored in a register of hardware called a CAN controller or in firmware running on a processor that operates when connected to the CAN controller.

(13) The individual ECUs (including a gateway and a head unit) in the embodiments described above are each assumed to be a device including, for example, digital circuits such as a processor and a memory, analog circuits, a communication circuit, and so forth, but may include other hardware components such as a hard disk drive, a display, a keyboard, and a mouse. In addition, instead of a control program stored in a memory being executed by a processor to implement functions in software, the functions may be implemented by dedicated hardware (such as a digital circuit).

(14) Some or all of the constituent elements included in each device in the embodiments described above may be constituted by a single system large-scale integration (LSI). The system LSI is a super-multifunctional LSI manufactured by integrating a plurality of configuration units on one chip, and is specifically a computer system configured to include a microprocessor, a ROM, a RAM, and so forth. The RAM has recorded thereon a computer program. The microprocessor operates in accordance with the computer program, thereby allowing the system LSI to achieve its function.

In addition, constituent units included in each device may be integrated into individual chips or into a single chip that includes some or all of the units.

While the system LSI is used here, an integrated circuit may also be referred to as an IC, an LSI, a super LSI, or an ultra LSI depending on the difference in the degree of integration. In addition, a technique for forming an integrated circuit is not limited to the LSI, and may be implemented by using a dedicated circuit or a general-purpose processor. A field programmable gate array (FPGA) that can be programmed after the manufacture of the LSI or a reconfigurable processor capable of reconfiguring connection or setting of circuit cells in the LSI may be used.

Additionally, if a technique for forming an integrated circuit is introduced in place of the LSI along with development in semiconductor technology or other derivative technology, it is a matter of course that the technique may be used for the integration of functional blocks. One potential approach is to apply biotechnology, for example.

(15) Some or all of the constituent elements included in each of the devices described above may be constituted by an IC card removably set in each device or a stand-alone module. The IC card or the module is a computer system constituted by a microprocessor, a ROM, a RAM, and so forth. The IC card or the module may include the super-multifunctional LSI described above. The microprocessor operates in accordance with a computer program, thereby allowing the IC card or the module to achieve its function. This IC card or module may be tamper-resistant.

(16) An aspect of the present disclosure may provide a method such as the anti-fraud method described above. An aspect of the present disclosure may also provide a computer program for implementing these methods by using a computer, or a digital signal including the computer program.

In an aspect of the present disclosure, furthermore, the computer program or the digital signal may be recorded on a computer-readable recording medium such as a flexible disk, a hard disk, a CD-ROM, an MO, a DVD, a DVD-ROM, a DVD-RAM, a BD (Blu-ray Disc (registered trademark)), or a semiconductor memory. An aspect of the present disclosure may also provide the digital signal recorded on such recording media.

In an aspect of the present disclosure, furthermore, the computer program or the digital signal may be transmitted via a telecommunication line, a wireless or wired communication line, a network represented by the Internet, data broadcasting, or the like.

A further aspect of the present disclosure may provide a computer system including a microprocessor and a memory, in which the memory has recorded thereon the computer program described above and the microprocessor operates in accordance with the computer program.

Moreover, the program or the digital signal may be recorded on the recording medium and transported, or the program or the digital signal may be transported via the network or the like, so as to be performed by any other independent computer system.

(17) Embodiments achieved by any combination of constituent elements and functions illustrated in the embodiments described above and the modifications described above also fall within the scope of the present disclosure.

The present disclosure is applicable for use in suppression of the influence of a malicious ECU in an in-vehicle network system or the like.

What is claimed is:

1. A method for use in a fraud-detection electronic controller, the fraud-detection electronic controller configured to be connected to a bus that a plurality of electronic controllers which communicate with each other in accordance with a Controller Area Network (CAN) protocol use for communication, the method comprising:

receiving a frame which has started to be transmitted;
determining whether or not content of a predetermined field in the frame meets a predetermined condition indicating fraud;
transmitting a frame including predetermined consecutive dominant bits for notifying an anomaly before an end of the frame is transmitted in a case where the content of the predetermined field in the frame meets the predetermined condition;
recording a number of times the frame including the predetermined consecutive dominant bits is transmitted in the transmitting, for each identifier (ID) represented by content of an ID field included in a plurality of frames which has been transmitted; and
determining a malicious electronic controller in accordance with the number of times recorded for each ID, wherein
in the determining the malicious electronic controller, in a case where the number of times recorded for one ID exceeds a predetermined count, one of the electronic controllers that has transmitted a frame having the one ID for which the number of times exceeds the predetermined count is determined to be the malicious electronic controller and to not transition to a passive state, and
the predetermined count corresponds to a value at which a transition to the passive state, specified in the CAN protocol in accordance with a rule for handling a transmission error counter, is to occur.

2. The method according to claim 1, wherein in the transmitting, transmission of the frame including the predetermined consecutive dominant bits is performed before an end of a Cyclic Redundancy Check sequence in the frame is transmitted.

3. The method according to claim 1, wherein the predetermined field comprises the ID field, and in the determining, an ID represented by the content of the predetermined field is compared with one or more IDs indicated by predetermined ID-list information to perform a determination of whether or not the predetermined condition is met.

4. The method according to claim 1, wherein the predetermined field comprises a control field, and in the determining, a determination of whether or not a data length represented by the content of the predetermined field is included in a predetermined range is performed to determine whether or not the content meets the predetermined condition.

5. The method according to claim 1, wherein the predetermined field comprises a data field, and in the determining, the predetermined condition includes the frame, which has started to be transmitted, being a data frame.

6. The method according to claim 5, wherein in the determining, a determination of whether or not a data value representing the content of the predetermined field is included in a predetermined range is performed to determine whether or not the content meets the predetermined condition.

7. The method according to claim 5, wherein in the determining, a message authentication code in the content of the predetermined field is verified by using a predetermined verification process procedure, and the content is determined to meet the predetermined condition in a case where a verification has failed.

8. A fraud-detection electronic controller for connection to a bus that a plurality of electronic controllers which communicate with each other in accordance with a Controller Area Network (CAN) protocol use for communication, the fraud-detection electronic controller comprising:
one or more memories; and
circuitry which, in operation, performs operations including:
receiving a frame which has started to be transmitted;
determining whether or not content of a predetermined field in the frame meets a predetermined condition indicating fraud;
transmitting a frame including predetermined consecutive dominant bits for notifying an anomaly before an end of the frame is transmitted in a case where the content of the predetermined field in the frame meets the predetermined condition;
recording a number of times the frame including the predetermined consecutive dominant bits is transmitted in the transmitting, for each identifier (ID) represented by content of an ID field included in a plurality of frames which has been transmitted; and
determining a malicious electronic controller in accordance with the number of times recorded for each ID, wherein
in the determining the malicious electronic controller, in a case where the number of times recorded for one ID exceeds a predetermined count, one of the electronic controllers that has transmitted a frame having the one ID for which the number of times exceeds the predetermined count is determined to be a malicious electronic controller and to not transition to a passive state, and
the predetermined count corresponds to a value at which a transition to the passive state, specified in the CAN protocol in accordance with a rule for handling a transmission error counter, is to occur.

9. A network communication system, comprising:
a plurality of electronic controllers that communicate with each other via a bus in accordance with a Controller Area Network (CAN) protocol; and
a fraud-detection electronic controller connected to the bus,
wherein the fraud-detection electronic controller comprises:
one or more memories; and
circuitry which, in operation, performs operations including:
receiving, by the fraud-detection electronic controller, a frame which has started to be transmitted;
determining, by the fraud-detection electronic controller, whether or not content of a predetermined field in the frame meets a predetermined condition indicating fraud;
transmitting, by the fraud-detection electronic controller, a frame including predetermined consecutive dominant bits for notifying an anomaly before an end of the frame is transmitted in a case where the content of the predetermined field in the frame meets the predetermined condition;
recording, by the fraud-detection electronic controller, a number of times the frame including the predetermined consecutive dominant bits is transmitted in the transmitting, for each identifier (ID) represented by content of an ID field included in a plurality of frames which has been transmitted; and
determining a malicious electronic controller in accordance with the number of times recorded for each ID, wherein
in the determining the malicious electronic controller, in a case where the number of times recorded for one ID exceeds a predetermined count, one of the electronic controllers that has transmitted a frame having the one ID for which the number of times exceeds the predetermined count is determined to be the malicious electronic controller and to not transition to a passive state, and
the predetermined count corresponds to a value at which a transition to the passive state, specified in the CAN protocol in accordance with a rule for handling a transmission error counter, is to occur.

10. The network communication system according to claim 9, wherein
a plurality of buses is used for communication by the plurality of electronic controllers,
the network communication system further comprises:
a gateway device having a function of transferring a frame between the plurality of buses; and
a plurality of fraud-detection electronic controllers each connected to a different bus,
the predetermined field comprises the ID field,
in the determining, an ID represented by the content of the predetermined field is compared with one or more IDs indicated by predetermined ID-list information to perform a determination of whether or not the predetermined condition is met, and the ID-list information is different for each of the plurality of fraud-detection electronic controllers.

* * * * *